United States Patent
Mayle et al.

(10) Patent No.: US 8,812,497 B2
(45) Date of Patent: *Aug. 19, 2014

(54) METHOD AND SYSTEM FOR CREATING MESSAGES INCLUDING IMAGE INFORMATION

(71) Applicant: KDL Scan Designs LLC, Dover, DE (US)

(72) Inventors: Neil L. Mayle, Cambridge, MA (US); David L. Rose, Brookline, MA (US)

(73) Assignee: KDL Scan Designs LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,303

(22) Filed: Jan. 11, 2013

(65) Prior Publication Data

US 2013/0191386 A1 Jul. 25, 2013

Related U.S. Application Data

(63) Continuation of application No. 12/973,195, filed on Dec. 20, 2010, now Pat. No. 8,380,756, which is a continuation of application No. 10/353,449, filed on Jan. 28, 2003, now Pat. No. 7,865,623, which is a continuation of application No. 09/384,674, filed on Aug. 27, 1999, now Pat. No. 6,542,936, which is a continuation of application No. 08/887,616, filed on Jul. 3, 1997, now Pat. No. 6,018,774.

(51) Int. Cl.
*G06F 17/30* (2006.01)

(52) U.S. Cl.
USPC .......... 707/729; 707/803; 707/804; 709/203; 709/206; 709/250

(58) Field of Classification Search
USPC .......... 707/607–609, 803–804, 729; 709/203–206, 250
See application file for complete search history.

(56) References Cited

U.S. PATENT DOCUMENTS

| | | |
|---|---|---|
| 5,414,524 A | 5/1995 | Payson et al. |
| 5,418,908 A | 5/1995 | Keller et al. |
| 5,426,594 A | 6/1995 | Wright |

(Continued)

FOREIGN PATENT DOCUMENTS

| | | |
|---|---|---|
| CA | 229784 | 5/2009 |
| EP | 739115 | 10/1996 |

(Continued)

OTHER PUBLICATIONS

Dictionary of Computers, Rosenberg J., Information Processing & Telecommunications, p. 574,1987.

(Continued)

*Primary Examiner* — Hanh Thai
(74) *Attorney, Agent, or Firm* — Stolowitz Ford Cowger LLP

(57) ABSTRACT

Storing image data and related information for sharing via a URL includes receiving image data uploaded from a client computer via a user interface and receiving, separate from the receiving of the image data, related information uploaded via the user interface. The uploaded image data and related information are stored. A uniform resource locator (URL) configured for retrieving a display that includes the stored image data and the related information is generated. The URL is provided in a message.

23 Claims, 18 Drawing Sheets

(56) References Cited

U.S. PATENT DOCUMENTS

| | | | |
|---|---|---|---|
| 5,552,994 | A | 9/1996 | Cannon et al. |
| 5,623,681 | A | 4/1997 | Rivette et al. |
| 5,666,490 | A | 9/1997 | Gillings |
| 5,671,282 | A | 9/1997 | Wolff et al. |
| 5,678,046 | A | 10/1997 | Cahill et al. |
| 5,732,229 | A | 3/1998 | Dickinson |
| 5,737,729 | A | 4/1998 | Denman |
| 5,740,428 | A | 4/1998 | Mortimore et al. |
| 5,748,484 | A | 5/1998 | Cannon et al. |
| 5,758,324 | A | 5/1998 | Hartman et al. |
| 5,760,916 | A | 6/1998 | Dellert |
| 5,760,917 | A * | 6/1998 | Sheridan ............... 358/442 |
| 5,764,235 | A | 6/1998 | Hunt et al. |
| 5,765,176 | A * | 6/1998 | Bloomberg ............ 715/209 |
| 5,771,355 | A | 6/1998 | Kuzma |
| 5,774,664 | A * | 6/1998 | Hidary et al. .......... 725/110 |
| 5,778,164 | A | 7/1998 | Watkins et al. |
| 5,778,181 | A * | 7/1998 | Hidary et al. .......... 725/110 |
| 5,778,372 | A | 7/1998 | Cordell et al. |
| 5,781,901 | A | 7/1998 | Kuzma |
| 5,781,909 | A * | 7/1998 | Logan et al. ............... 1/1 |
| 5,790,790 | A | 8/1998 | Smith et al. |
| 5,790,793 | A | 8/1998 | Higley |
| 5,793,966 | A * | 8/1998 | Amstein et al. ......... 709/203 |
| 5,806,005 | A | 9/1998 | Hull et al. |
| 5,832,221 | A | 11/1998 | Jones |
| 5,844,969 | A | 12/1998 | Goldman et al. |
| 5,867,633 | A | 2/1999 | Taylor, III et al. |
| 5,903,723 | A | 5/1999 | Beck et al. |
| 5,905,865 | A * | 5/1999 | Palmer et al. .......... 725/112 |
| 5,909,551 | A * | 6/1999 | Tahara et al. .......... 709/231 |
| 5,918,012 | A * | 6/1999 | Astiz et al. ............. 709/217 |
| 5,923,846 | A | 7/1999 | Gage et al. |
| 5,928,330 | A * | 7/1999 | Goetz et al. ............ 709/231 |
| 5,929,849 | A * | 7/1999 | Kikinis ................... 725/113 |
| 5,948,061 | A * | 9/1999 | Merriman et al. ...... 709/219 |
| 5,956,729 | A * | 9/1999 | Goetz et al. ............ 707/802 |
| 5,982,445 | A * | 11/1999 | Eyer et al. ............... 348/461 |
| 5,986,707 | A | 11/1999 | Geshwind |
| 5,987,504 | A | 11/1999 | Toga |
| 6,009,462 | A | 12/1999 | Birrell et al. |
| 6,014,644 | A | 1/2000 | Erickson |
| 6,017,157 | A | 1/2000 | Garfinkle et al. |
| 6,018,774 | A | 1/2000 | Mayle et al. |
| 6,026,429 | A | 2/2000 | Jones et al. |
| 6,026,449 | A | 2/2000 | Takenaka |
| 6,035,330 | A * | 3/2000 | Astiz et al. ............. 709/218 |
| 6,058,373 | A * | 5/2000 | Blinn et al. ............ 705/26.81 |
| 6,085,195 | A | 7/2000 | Hoyt et al. |
| 6,119,135 | A | 9/2000 | Helfman |
| 6,182,127 | B1 | 1/2001 | Cronin, III et al. |
| 6,192,407 | B1 | 2/2001 | Smith et al. |
| 6,253,216 | B1 | 6/2001 | Sutcliffe et al. |
| 6,275,848 | B1 | 8/2001 | Arnold |
| 6,316,761 | B1 | 11/2001 | Yamaguchi |
| 6,329,994 | B1 * | 12/2001 | Gever et al. ............ 345/473 |
| 6,336,115 | B1 | 1/2002 | Tominaga et al. |
| 6,507,371 | B1 * | 1/2003 | Hashimoto et al. ........ 348/552 |
| 6,542,936 | B1 | 4/2003 | Mayle et al. |
| 6,573,927 | B2 | 6/2003 | Parulski et al. |
| 6,745,224 | B1 * | 6/2004 | D'Souza et al. ........ 709/202 |
| 7,865,623 | B2 | 1/2011 | Mayle et al. |
| 2005/0055627 | A1 | 3/2005 | Lloyd et al. |
| 2011/0093444 | A1 | 4/2011 | Mayle |

FOREIGN PATENT DOCUMENTS

| | | |
|---|---|---|
| EP | 1002273 | 5/2000 |
| WO | 9849643 | 11/1998 |
| WO | WO2009901818 | 1/1999 |

OTHER PUBLICATIONS

"The Digital Postcard FAQ," Internet Article [online] Jun. 6, 1997 [retrieved from the Internet Feb. 25, 2005] <URL: http://web.archive.org/web/19970606070422/http://www.all-yours.net/postcard/faq.htm> (2 pages).

"Under the Sun—Interactive Web Site," Internet Article [online] Apr. 12, 1997 [retrieved from the internet Feb. 25, 2005] <URL:http//web.archive.org/web/19970412124301/http://www.underthesun.com/digital.sub.--pickup.html> (1 page).

"BCYellow.com—Birthday Cards," Internet Article [online] Feb. 14, 1997 [retrieved from the Internet Feb. 25, 2005] <URL:http://web.archive.org/web/19970214111638/http://www.bcyellow.com-/BirthdayCards/top> (2 pages).

"Image Alchemy," Internet Article [online] Jun. 24, 1997 [retrieved from the Internet Feb. 25, 2005] URL:http://web.archive.org/web/19970624191154/www.handmadesw.com/hsi/web.- sub.--alchemy.html> 2 pages.

Thimm, et al., "A Mail-based Teleservice Architecture for Archiving and Retrieving Dynamically Composable Multimedia Documents," In Proceedings of the Conference on Multimedia Transport and Teleservices, MMTT94, Nov. 13-15, 1994, 19 pages.

Berners-Lee, T., et al., "Hypertext Transfer Protocol—HTTP/1.0," IETF Standard-Working-Draft, Internet Engineering Task Force, IETF, CH, Nov. 28, 1994, XP015013162.

JP-07-221966 (Hitachi Ltd), abstract, Aug. 18, 1995 In: Patent Abstracts of Japan [online].

Lassig, D., et al., "Multimedia Authoring Tool for Internet," NEC Technical Journal, Japan, Kabushiki Kaisha NEC Creative, Apr. 25, 1997, vol. 50, No. 4, pp. 53-57.

"Adobe PhotoDeluxe Expands Internet Functionality; AT&T WorldNet and PhotoNet Online Services Provide Easy Internet Image Distribution," PR Newswire, Feb. 10, 1997, 3 pages.

America Online and Pictureplace Break New Ground with First Online Photo Service; New Service Redefines Traditional Picture Processing with Real-Time Generation Online, PR Newswire, Sep. 20, 1995, 3 pages.

"Electric Greetings," Associated Newspapers Ltd., Mail on Sunday, Oct. 15, 1995, 1 page.

"Web Document-Delivery Products Surging," InfoWorld, v. 18, No. 50 at 6 (Dec. 9, 1996), 3 pages.

Kodak Offers Retailers, Users New Benefits in Tradition and Digital Products at PMA, Business Wire, Feb. 20, 1997, 2 pages.

Kodak Touts New Technology, Chain Drug Review 19.n6 at p. 76 (Mar. 17, 1997), 3 pages.

Web pages of www.kodak.com, available through archive.org with a reference date of May 23, 1997, 3 pages.

Netropolitan, New Scientist, Apr. 8, 1995, 1 page.

Web pages of www.photonet.com available through archive.org with a reference date of Dec. 31, 1996 and Apr. 8, 1997, 5 pages.

"Pictra First to Make Publishing and Sharing Photo Albums Over Internet Snap," Business Wire, May 12, 1997, 3 pages.

Pictra Puts Your Photo Album on the Web for Free, PC World, Jun. 13, 1997, 1 page.

Pictra website www.pictra.com/prodser/main.html#6 as archived on Oct. 9, 1997, 7 pages.

Pictra website www.pictra.com/prodser/net.sub.--overview.html as archived on Oct. 9, 1997, 3 pages.

"Pictra Wins PMA '97 Innovative Product Award," Business Wire, Mar. 13, 1997, 2 pages.

"Picture This American Greetings On-Line Introduces Add-a-Photo Cards to Web Site Offering; PictureVision Partnership Brings Internet Photo Technology to Greeting Cards," PR Newswire, Dec. 12, 1996, 2 pages.

Pictureplace, AOL's Innovative Online Photo Service, Becomes Pictureweb; Announces Strategic Alliances with Adobe Systems and Mystic Color Lab, PT Newswire, Jan. 4, 1996, 3 pages.

"Picturevision and MGI Software to Integrate Photonet with MGI Photosuite," Feb. 20, 1997, 2 pages.

"Seasons Greeting from the Internet; Send Zippy Holiday Cards Without a Zip Code," The Boston Herald, Dec. 8, 1995, 2 pages.

Burkhard Wiegel, Secure External References in Multimedia Email Messages, 3rd ACM Conference on Computer and Communication Security, Mar. 14-16, 1996, New Delhi, India, pp. 11-18 (8 pages).

"Sending 'Postcards' Via the Internet," Plain Dealer, Jul. 1, 1996, 2 pages.

(56) References Cited

OTHER PUBLICATIONS

"The Digital Postcard," [online] www.all-yours.net/postcard, Jan. 13, 1997, 4 pages.
Archived "The Electric Postcard" Website, available through archive.org at postcards.www.media.mit.edu, Nov. 11, 1996, 3 pages.
"Tumbleweed App Lets Users Send Files in any Format," Macweek, v. 10; n. 48, at 18, Dec. 16, 1996, 2 pages.
"Tumbleweed Software Announces Tumbleweed Posta Support for PaperPort; The Complete Solution for 'Scan and Send' Document Delivery," Business Wire, Mar. 31, 1997, 2 pages.
"Tumbleweed Software Ships First Secure Internet Courier; Net Product Combines Express Delivery Features with Power of Technology," Business Wire, Jun. 9, 1997, 3 pages.
"A FedEx for the Internet," MacWorld, v. 14 n2 p. 37, Feb. 1997, 3 pages.
"Cyber Greetings Sending Instant Holiday Cards is Just a Click Away," The Kansas City Star, Dec. 21, 1996, Business Section, p. B1, 3 pages.
Freed, et al., "Definition of the URL MIME External-Body Access-Type," [online] Draft IETF Document, Nov. 1995 [retrieved on Oct. 30, 2007] Retrieved from the Internet: <URL: www.draft-ietf-mailext-acc-url-01.txt>, 7 pages.
"Global Communications Leader, DynaLab and Tumbleweed Announce Worldwide Partnership for Tumbleweed Posta," Business Wire, p. 12110209, Dec. 11, 1996, 3 pages.
"Information Technology: Safe Delivery of Electronic Documents," Financial Times, London Edition, 1 Ed, p. 22, Jun. 18, 1997, 2 pages.
Freed, et al., "RFC 2017—Definition of the URL MIME External-Body Access-Type," [online] Request for Comments Document, Oct. 1996 [retrieved on Oct. 30, 2007] Retrieved from the Internet: <URL: www.tools.ietf.org/html/rfc2017>, 5 pages.
"TumbleWeed Posta to Support Microsoft's Active Platform," PR Newswire, p. 103842SFTU017, Dec. 10, 1996, 3 pages.
"Tumbleweed Software CEO Pushes for RealWorld Solutions at Internet Showcase," PR Newswire, p. 0429SFTU075, Apr. 29, 1997, 2 pages.
"Tumbleweed Software Corp. Is Expanding Its Business and Wants resellers to Help," Computer Reseller News, n 725, p. 73, Mar. 3, 1997, 3 pages.
Web Photo Finish, PC Magazine, Nov. 5, 1996, p. 31 (1 page).
"Web Used to Distribute Documents," Computer World, v. 31, n8, p. 14(1), 3 pages.
"21st Century Greeting Card Company Electronic Birthday Card Order Form," [online] as archived Nov. 14, 1996 at <URL: http://http://web.archive.org/web/19961114090736/http://sacbiz.com/21cgreet/birthday.html>, 3 pages.
"21st Century Greeting Card Company," [online] as archived Apr. 27, 1997 at <URL: http://http://web.archive.org/web/19970427092254/www.sacbiz.com/21cgreet/->, 2 pages.
"American Greetings Corporation Extends Commitment to Electronic Marketplace; Alliances with Industry Leaders Strengthen Venture," PR Newswire, Sep. 4, 1996, 3 pages.
"American American Greetings Introduces Animated Greetings—Personalized Electronic Cards that Sing, Dance and Croak; Partnership with Pineapple Ltd. Yields E-mails with Pizzazz," PR Newswire, Dec. 18, 1996, 3 pages.
"Animated Greeting Cards," [online] as archived on Oct. 28, 1996 at <URL: http://web.archive.org/web/19961028073109/http://www.greetme.com-/>, 2 pages.
"Arizona's WebHub Postcards," [online] as archived on Oct. 29, 1996, at <URL: http://web.archive.org/web/19961029181043/azwebhub.com/postcards-/postcards.html>, 2 pages.
"Awesome Cyber Cards," [online] as archived on Nov. 10, 1996, at <URL: http://web.archive.org/web/19961110022650/http://www.marlo.com/>, 1 page.
"Awesome You Write It Cyber Postcards," [online] as archived on Nov. 10, 1996, at <URL: http://web.archive.org/web/19961110030018/www.marlo.com/postcard.htm>, 5 pages.

"Birthdays at Greet.com," [online] archived on Nov. 5, 1996, as <URL: http://web.archive.org/web/19961105143939/www.greet.com/birthday/index.ht-ml>, 2 pages.
"WWW Build-A-Card," [online], archived on Jan. 29, 1996, as <URL: http://scout.wisc.edu/Projects/PastProjects/NH/96-01/96-01-30/0040.html>, 1 pages.
"Build A Card FAQ," [online] archived on Oct. 31, 1996, as <URL: http://web.archive.org/web/19961031192908/buildacard.com/faq.htm>, 2 pages.
"Canadian Wheelchair Basketball Association Freethrows 0089," Free Throw bi-weekly circular, Feb. 14, 1997, 2 pages.
Card Finder!, [online] as archived on Nov. 10, 1996, at <URL: http://web.archive.org/web/19961110023245/www.marlo.com/cardfind.htm>, 4 pages.
"Create Beautiful Web Valentines," [online] archived on Feb. 4, 1996 as <URL: http://groups.google.com/group/comp.internet.net-happenings/msg/-577dd7f628f9f0d8?dmode=source&utoken=s0>, 1 page.
"Desktop Publishing Applications," the GIFfer's File Warehouse, Dated May 1996-Oct. 1997, 2 pages.
"E-Cards Demystified: A Primer," Family Planet, archived on Oct. 17, 1996 as <URL: http://web.archive.org/web/19961017233944/family.starwave.com/ecards/help-.html>, 3 pages.
"Free Electronic Postcards," [online] archived on Nov. 23, 1996, as <URL: http://groups.google.com/group/comp.internet.net-happenings/msg/-1bec19d2c7853d73?hl=en&dmode=source&ut>, 3 pages.
"The Greet Network," [online] archived on Dec. 27, 1997 as <URL: http://web.archive.org/web/19961227180126/http://netropolis.org/>, 1 page.
"Greeting Cards by Awesome Cyber Cards," [online] as archived on Nov. 10, 1996, at <URL: http://web.archive.org/web/19961110023222/www.marlo.com/card.htm>, 3 pages.
"Happy Halloween," Family Planet, archived on Oct. 18, 1996, as <http://web.archive.org/web/19961018000400/family.starwave.com/ecards/-ween/kid1.html>, 2 pages.
"Have You Received A Card Announcement," [online] as archived on Nov. 10, 1996, at <URL: http://web.archive.org/web/19961110023739/www.marlo.com/findhelp.htm>, 5 pages.
"Have Your Own Greeting Card Site," NetMC, URL Not Known, Date Not Known, 1 page.
"House of Cards," Family Planet, archived on Oct. 17, 1996 as <URL: http://web.archive.org/web/19961017232336/family.starwave.com/ecards/inde-x.html>, 2 pages.
Raggett, D., "HTML 3.2 Document Type Definition," [online] W3C Document, Jun. 25, 1996, Retrieved from the Internet: <URL: http://scholar.lib.vt.edu/reports/soasis-slides/html-3.sub.--2.dtd>, 10 pages.
Raggett, D., "HTML 3.2 Reference Specification, Reccomendation" [online] W3C, Jan. 14, 1997, Retrieved from the Internet: <URL: http://www.w3.org/TR/REC-html32>, 43 pages.
Raggett, D., "HTML 3.2 Reference Specification," [online] W3C, Sep. 9, 1996, Retrieved from the Internet: <URL: http://exodus.cs.ccu.edu.tw/.about.rhhwang/html/html32.html>, 42 pages.
"Let Me Choose My Own Present," Virtual Presents Network, as archived on Apr. 12, 1997, <URL: http://web.archive.org/web/19970412145728/www.virtualpresents.com/myown.h-tml>, 1 page.
"Mom.Com," Copyright 1996 The Times-Picayune Publishing Co., New Orleans, LA, May 9, 1996, 3 pages.
"Multimedia Authoring Tool for Web Pages and Stand Alone Presentations," Copyright 1996, NEC Laboratory, Inc., 2 pages.
"Multimedia Greeting Cards," NEC NetMC Home Page, date unknown, URL not known, 1 page.
"NEC Announces Novice-User Multimedia Authoring Tool for Web Sites and Presentations," M2 PressWire, May 2, 1996, 4 pages.
"NEC Announces Official Release of NetMC; Multimedia Authoring Tool, with Netscape," Business Wire, Oct. 21, 1996, 6 pages.
"Net Happenings Digest," [online] Google News Groups, <URL: http://groups.google.com/group/mlist.net-happenings/msg/82be09d13e2a185e?-hl=en&dmode=source&output=gpl>, 11 pages.

(56) References Cited

OTHER PUBLICATIONS

"Net Happenings Digest," [online] Google News Groups, <URL: http://groups.google.com/group/mlist.net-happenings/msg/2aa6628f24519899?-hl=en&dmode=source&utoken=g1R>, 10 pages.
"Net Happenings Digest—Apr. 4, 1996, Special Issue," as archived on Apr. 4, 1996, URL not known, 56 pages.
"Polaroid becomes first company to offer free URL to digital greeting card participants on the World Wide Web," Business Wire, Dec. 9, 1996, 2 pages.
"The David Jones Send a Card Website," [online] archiived on Feb. 14, 1997 as <URL: http://web.archive.org/web/19970214113044/www.davidjones.com.au/send.sub.- --card.htm>, 1 page.
"Send-Out!," [online] as archived on Nov. 10, 1996, at <URL: http://web.archive.org/web/19961110030405/www.marlo.com/sendout.htm, 4 pages.
"Sent Your Holiday Cards Yet?" archived communication dated Dec. 13, 1996, from Jos Gouw <jgouw@netmc.neclab.com>, 1 page.
"Sent Your Valentine Card Yet?" archived communication dated Feb. 11, 1997, from NetMc <netmc@netmc.neclab.com>, 1 page.
Shopping on the Internet Highway, [online] The Internet Mall, archived on May 6, 1996, as <URL: http://groups.google.com/group/comp.newprod/msg/759fae06216fcf0b?dmode=source&utoken=uoJgxSwAAACS>, 30 pages.
"Soft Free Multimedia Authoring Tool Software," [online] archived on Oct. 18, 1996, URL not known, 1 page.
"Start Your Engines and Get Ready to Enter the Web," The Jerusalem Post, Oct. 11, 2006, Features Section, p. 7 (3 pages).
"Sun 0S5.4 Sendmail Option," [online] archived on May 4, 1997, URL not known, 4 pages.
"Tips about Awesome Cyber Cards and Web Sites in General," [online] as archived on Nov. 10, 1006, at <URL: http://web.archive.org/web/19961110023252/www.marlo.com/cardhelp.htm, 5 pages.
"Virtual Presents," archived communication dated Aug. 30, 1996, from <package-room@virtualpresents.com>, 1 page.
"Virtual Presents," archived communication dated Oct. 23, 1996, from <package-room@virtualpresents.com>, 1 page.
Virtual Presents New Features Coming Soon, Virtual Presents Network, as archived on Apr. 15, 1997, <URL: http://web.archive.org/web/19970415182401/www.virtualpresents.com/new.html>, 1 page.
"Virtual Presents Web Page," Virtual Presents Network, as archived on Nov. 15, 1996, <URL: http://web.archive.org/web/19961115162037/http://virtualpresents.com/>- , 2 pages.
"Web Greeting Cards at Greet.Com," [online] archived on Nov. 5, 1996 as <URL: http://web.archive.org/web/19961105143921/http://www.greet.com/&- gt;, 2 pages.
"Welcome to the Best of Build A Card," [online] archived on Oct. 31, 1996, as <URL: http://web.archive.org/web/19961031001206/buildacard.com/best/>, 1 page.
Nebel, et al., "RFC 1867—Form-Based File Upload in HTML," [online] The Internet Community, Nov. 1995 [retrieved on Dec. 25, 2007] Retrieved from the Internet: <URL: http://www.ietf.org/rfc/rfc1867.txt>, 12 pages.
Koichi Sato "Construction of an Intranet Using a WWW DB Linkage System" Collection of papers of the 54th annual meeting held on Mar. 12-14, 1997, Information Processing Society of Japan, Mar. 14, 1997, pp. 3-195 to 3-196 (Document in Japanese, English-language translation attached).
Yukimitdu Izawa, "How to Develop a WWW Server", Internetworking, Internetworking, vol. 3, ASCII corporation, Mar. 1, 1997, pp. 12-18 (Document in Japanese, English-launguage translation attached).
Akira Sakamoto, "Multimedia Distributed Cooperative and Mobile Workshop," Collection of paper of DICOMO sysposiums of 1997-2006 [DVD-Rom] Multimedia, Distributed cooperative and Mobile Symposium,Information Processing Society of Japan, Jul. 2, 1997, vol. 97, No. 2, pp. 161-166 (Document in Japanese, English-language translation attached).
Imaizumi H., "What's cool" Internet Magazine, "Mail a Meal—Gourmet Postcards" Kabushikikaisha Impress, Feb. 1, 1997, No. 25, pp. 289-293 (document in Japanese, English-language translation attached).
America Online Offers Online Photo Service Newsbytes, Sep. 22, 1995, 2 pages.
Bamshad Mobasher et al., "Web Mining: Pattern Discovery from World Wide Web Transactions"; Department of Computer Science University of Minnesota; Mar. 8, 1997; 12 pages.
Georganas, Nicolas; "Multimedia Applications Development: Experiences" Dept. of Electrical and Computer Engineering University of Ottawa; Copyright: J. MTAP; no date given; 20 pages.
Gaines, Brian et al.; "A Networked, Open Architecture Knowledge Management System" Knowledge Science Institute University of Calgary, Alberta, CA; no date given; 22 pages.
Lassig, Dan et al.; NETMC: Multimedia Authoring Tool for Internet; NEC Technical Journal, Japan, NEC Creative Corporation, Apr. 25, 1997, vol. 50, No. 4, pp. 53-57.
The Digital Postcard FAQ, Jun. 6, 1997 URL:http://web.archive.org/web/19970606070422/http://www.all-yours.net/postcard/faq.htm.
Akihiko Yabu; "Wakaru, Dekiru, Tsukaeru, Internet", the 10th ASAHI Pasocon, Japan, The Asahi Shimbun Co., Jun. 1, 1997, No. 198, P112.
"The Playhere Postcard FAQ" [online] Jun. 6, 1997, All-Yours.net [retrieved on Aug. 2, 2010]; retrieved from the internet http://web.archive.org/web/19970606070422/http:www.allyours.net/postcard/faq.htm; 3 pages.
JP-11-007405 (Tominaga), abstract, Jan. 12, 1999, In: Patent Abstracts of Japan (online) 1 page.
Seiki Takafumi ; Declaration of Nikkey Byte's Entry to WWW;Nikkey Byte vol. 153; Nikkei Byte, Japan; Nikkei Business Publications, Inc.; Jun. 22, 1996; pp. 184-187.
HTML3.2 Reference Specification; Jan. 14, 1997; URL; http://www.doraneko,org/webauth/html32/19970114/Overview.html.
Takahashi, Kazuhisa; Homepage a la carte; Computer Today; Japan; Science Co., Ltd. Nov. 1, 1995, vol. 12, pp. 30-35.
Fujikawa, Tadahiko; Andwer Book for Homepage Designs; Web Studio; Japan; Bunkahoso Brain Co., Ltd.; Jun. 1, 1997; vol. 3, p. 42.
Kawamata, Yukio; internet Technolgy in the Age of Multimedia, Interface, vol. 21, No. 9.; Japan; CQ Publishing Co.,; Sep. 1, 1995; vol. 21, pp. 151-157.
JP2001-509617; English Abstract corresponding to WO9901818; Jul. 24, 2001; Patent Abstracts of Japan Espacenet [online].
JP10-145543; English Abstract May 29, 1997; Patent Abstracts of Japan [online].
Stolowitz Ford Cowger LLP; Related Case Listing; 1 page; Jan. 10, 2013.
"Web Used to Distribute Documents," Computer World, v. 31, n8, p. 14(1), Feb. 24, 1997, 3 pages; (online: http://books.google.com/books?id=q60iT-ThpgMC&printsec=frontcoyer&source=gbs_ge_summary_r&cad=0#v=onepage&q&f=false).
"Have Your Own Greeting Card Site," NetMC, URL Not Known, contact netmc@syl.sj.nec.com.com; retrieval date unavailable; 1 page.
"Multimedia Greeting Cards," NEC NetMC Home Page; URL not known, contact: netmc@netmc.neclab.com; retrieval date unavailable; 1 page.
"Net Happenings Digest," [online] Google News Groups, <URL: http://groups.google.com/group/mlist.net-happenings/msg/82be09d13e2a185e?-hl=en&dmode=source&output=gpl>, end date Apr. 4, 1996; 11 pages.
"Net Happenings Digest," [online] Google News Groups, <URL: http://groups.google.com/group/mlist.net-happenings/msg/2aa6628124519899?- hl=en&dmode=source&utoken=glR>, end date Jan. 30, 1996; 10 pages.
Gaines, Brian et al.; "A Networked, Open Architecture Knowledge Management System" Knowledge Science Institute University of Calgary, Alberta, CA; Proceedings of the 10th Knowledge Acquisition for Knowledge-Based Systems Workshop; Nov. 1996; 22 pages.

* cited by examiner

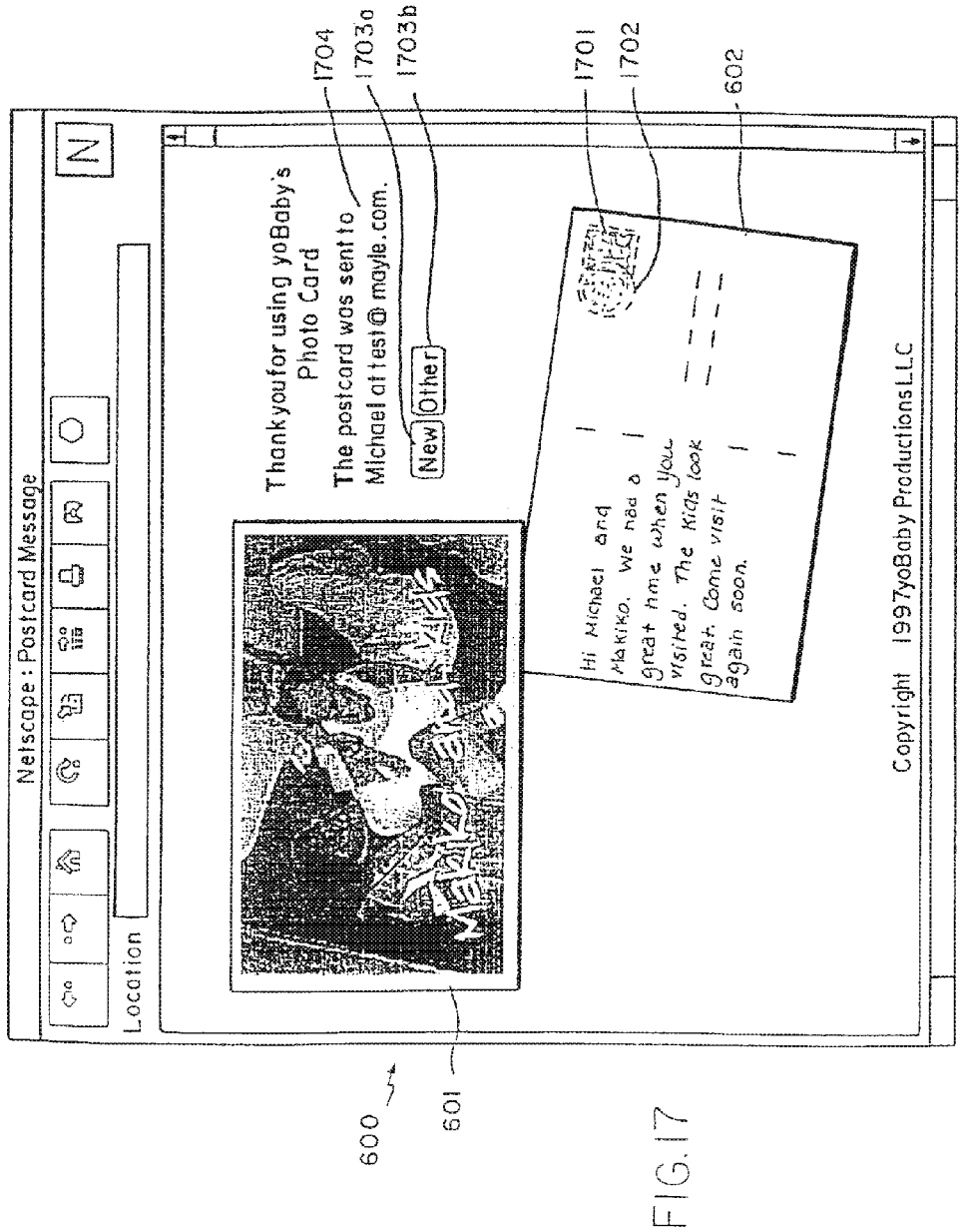

METHOD AND SYSTEM FOR CREATING MESSAGES INCLUDING IMAGE INFORMATION

RELATED APPLICATIONS

This application is a continuation of and claims priority to U.S. patent application Ser. No. 12/973,195, filed Dec. 20, 2010, now issued as U.S. Pat. No. 8,380,756, which is a continuation of U.S. patent application Ser. No. 10/353,449, filed on Jan. 28, 2003, now U.S. Pat. No. 7,865,623, which is a continuation of U.S. patent application Ser. No. 09/384,674, filed on Aug. 27, 1999, now issued as U.S. Pat. No. 6,542,936, which is a continuation of U.S. patent application Ser. No. 08/887,616, filed on Jul. 3, 1997, now issued as U.S. Pat. No. 6,018,774, all of which are incorporated herein by reference in their entirety.

The present invention relates generally to image processing and manipulation and more specifically to a system for the creation of electronic postcards.

BACKGROUND OF THE INVENTION

Photographic images or pictures may be represented and stored as a sequence of digital information. For instance, a photograph may be placed into a scanner connected to a computer system. The scanner is designed to convert images into digital information. A typical scanner comprises a row of discrete light sensors that are stepped sequentially across the photograph. At each discrete step the intensity and/or color of the photograph is measured by each discrete sensor in the row. The values are read out of the sensors prior to moving the row to the next discrete step. The row of light sensors is thus moved step-by-step across the photograph until the entire image is scanned. The end result is an array of data values representing the photographic image, where each value is the measurement taken by the discrete sensor element for a particular row. The information collected may then be transferred to a computer for further processing. This process of converting image information into discrete values representing individual picture elements or pixels is also known as scanning. In the past, the typical way to create an electronic image was through such a scanner connected to a computer. Thus, if an individual desired to have a digital electronic photograph the individual would typically use a conventional photographic camera to create a film image, have it processed onto photographic paper, and then scan the image into a computer with a scanner. Recently, this process has changed with the advent of digital cameras—cameras that directly create a digital photograph that may be transferred directly into a computer.

The creation of digital cameras has created an opportunity to utilize the unique aspects of a digital photograph. For instance, a digital photograph can be sent across a computer network and shared by others electronically. In addition, digital photographs allow further image manipulation.

Recent advances in technology have broadened the utility of digital photographs. The first advance is the penetration of powerful personal computers in the home environment. These new personal computers are capable of running complex processing applications. Today, a typical system includes a 32 bit processor, large memory array, high capacity mass storage device, high resolution color monitor and fast modem. The price for such a system is now within the budget of many households. The second advance is the development and acceptance of the world wide web (WWW, web or Internet) as a mode of exchanging electronic information. The web is a network of computer systems that allow the free interchange of information. Users at a home computer or clients connects via a modem to the web via an Internet Service Provider (ISP) which provides users local access to the web. Users seeking access to the web typically dial up and connect to an ISP, which acts as an intermediary and passes data between the web and the user. Also connected to the web are servers—computers capable of supplying information or services to users. Each individual computer connected to the web has a unique identifier so that information can be directed to the proper location. Information is passed between users on the web via pages displayed on a browser.

ISPs also provide the home user the ability to send and receive electronic mail (email). Often an individual accessing the web will have an email address, a unique identifier for a particular user that allows that user to receive mail. The ISP will receive the email for the user and store it until the user dials into the ISP to actually retrieve the messages. These events have created a situation where an individual at home can download the images captured by their digital camera or scanner into their home computer, connect to the web by modem in their computer, and transmit their picture onto the web. Thus, the individual can send the image to a second person, at a remote location.

As digital cameras become widely accepted, a greater need will arise for flexibility in the electronic distribution of images. Current methods for distribution include email where the digital photograph is converted to a textual representation, sent to the remote user who then converts the textual representation back into the digital photograph. Users may also distribute the digital photograph via predesigned web pages which allows any number of remote users to examine the digital photograph. None of the current mechanisms allow the user to transfer a digital photograph to a server, process the image data into a display and send a notification to one or more specific individuals to view the display.

SUMMARY

Accordingly, it is a goal of the present invention to provide a system which can load a picture image onto a server and to provide notice to specific individuals.

It is an alternate goal of the present invention to allow the creation of electronic postcard composed of the user's digital photograph.

It is an alternate goal of the present invention to allow the creation of electronic postcard that mimics aspects of a conventional postcard.

It is an alternate goal of the present invention to allow the creation of electronic postcard having a postmark or logo information.

It is an alternate goal of the present invention to allow the creation of electronic postcard that includes the ability to merge text information with the digital photograph.

Other objects will be obvious and will appear hereinafter. The invention comprises an article of manufacture as exemplified in the following summary and detailed description. The present invention is a system and method for processing electronic image data. The system comprises at least one server computer connected to a network. The server is adapted to receive electronic image data front a second computer connected to the network. The server processes the electronic image data and creates a display containing at least a portion of the processed electronic image data. One or more displays may be assigned a unique identifier. The data representing the display is in a format that allows for transmission to and viewing on a client computer. Viewing on the client computer is preferably accomplished via a web browser. The server is also adapted to send a notification containing the unique identifier to at least one person via the network. The person receiving the unique identifier can retrieve the one or more displays represented by the identifier from the server for viewing.

The processing on the server consists of one or more of the following: captioning, formatting, storing, transmitting, centering, cropping, flipping, anti-aliasing, scaling, compressing, filtering, color correcting, adding special borders and/or corner motifs, blurring, and adding visual effects. In addition, the client may be augmented to perform a portion of the processing during interactions with the server.

The data for the electronic image may also be provided via a photo processor where film is developed and then converted into an electronic image. The data representing the electronic image may then be transferred from the photo processor to the client computer or directly to the server computer.

The above mentioned objectives of the present invention will become more apparent and the invention itself better understood with reference to the following description of the embodiments of the present invention in conjunction with the accompanying drawings.

BRIEF DESCRIPTION OF THE DRAWINGS

The foregoing discussion will be understood more readily from the following detailed description of the invention, when taken in conjunction with the accompanying drawings, in which:

FIG. 17 is an image of the present invention electronic postcard illustrating the display of a sent postcard.

DESCRIPTION OF THE PREFERRED EMBODIMENTS

System Architecture

Figure 1:
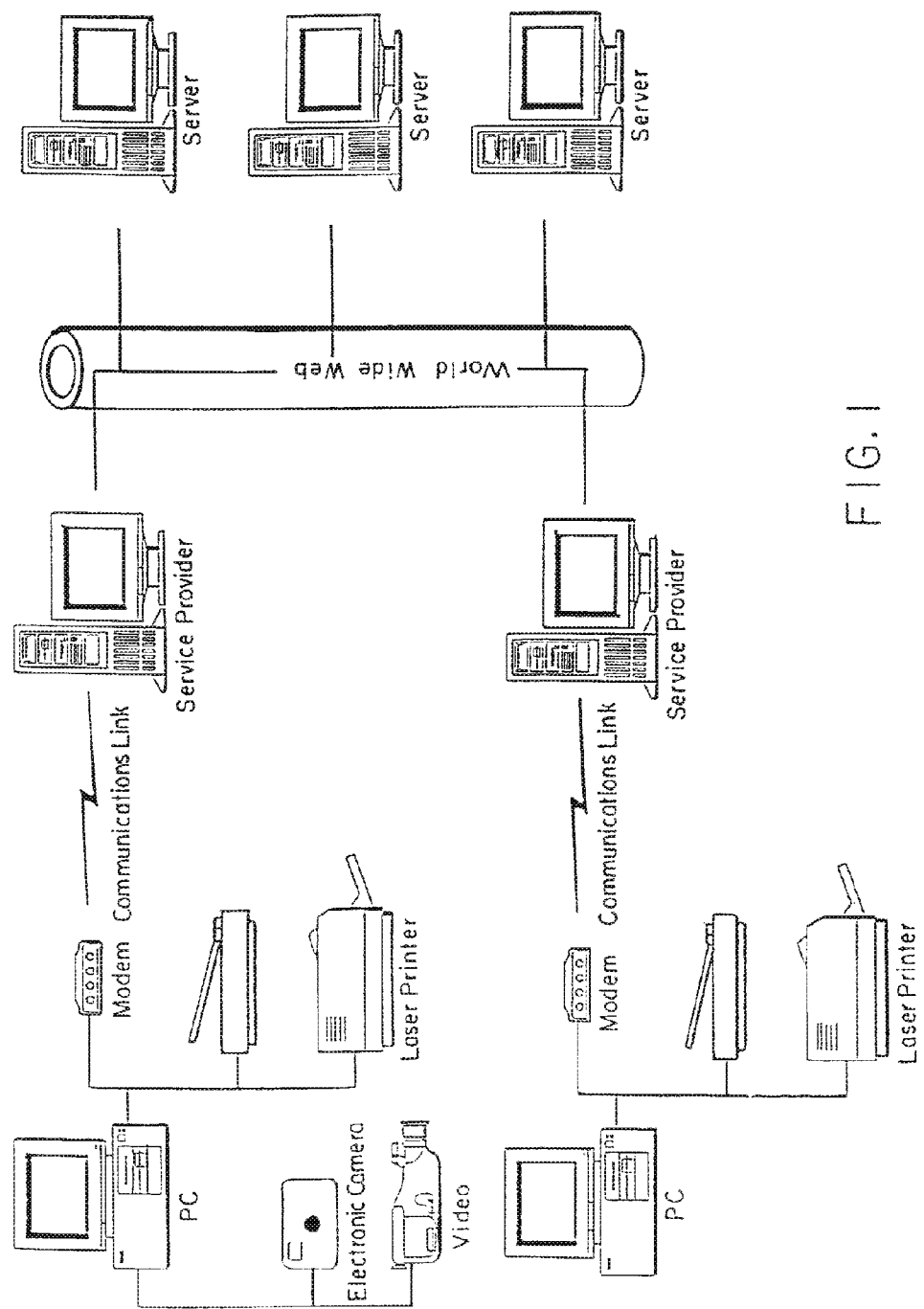
FIG. 1 is a simplified block diagram of connections to the web.

The present invention relates to a system for the generation of electronic postcards for distribution via an electronic network. FIG. 1 illustrates a simplified view of a network of computers. Two basic machines are connected to the network, user (or client) computers 10 and 20, and server systems 31 through 35. User computers, for example computer 10, are conceptually separate from server systems, as they provide the functions necessary for a typical user to connect to the network and exchange information with other user computers and server systems. In the present invention, the user computer 10 may interface to a variety of peripheral devices, including a scanner 12, printer 13, video camera 14 and digital camera 15. In addition, the user computer 10 communicates via a communications device 11, here illustrated as a modem, for communicating over the network.

The user computer 10 of the present invention is connected to a broader system of networked computers as illustrated in FIG. 1. In this environment, user computer 10 connects via the modem 11 to an ISP 31. The ISP provides the interface between the user computer and the web 30. The ISP 31 may also provide other services, such a receipt and storage of user email, storage of user files and various other services. As the interface to the web 30, the ISP 31 receives packets of data from the user computer 10 and stores the received information or forwards the information on the web 30 to the addressed destination. The addressed destination may be one of the servers 31-35 or may be a separate user computer 20. One of ordinary skill in the art will appreciate the variety of configurations possible on such a network. While the web is illustrated as a single network, it is understood that it may comprise one of a number of local area networks (LANs) and wide area networks (WANs).

In the preferred embodiment, the electronic postcard functionality is implemented as a component of a web site. A web site is essentially a server computer providing public access to one or more files containing hypertext documents. A user utilizing a web browser running on a client computer 10 to access the hypertext documents stored on one or more server computer 31-35 located on the network 30. The server, running hyper text transfer protocol (HTTP) web server software, transfers the hypertext document to the user computer for display on the browser. The present invention is directed to software that adapts the server to perform the functions necessary to create and transmit an electronic postcard.

Server

Figure 2:
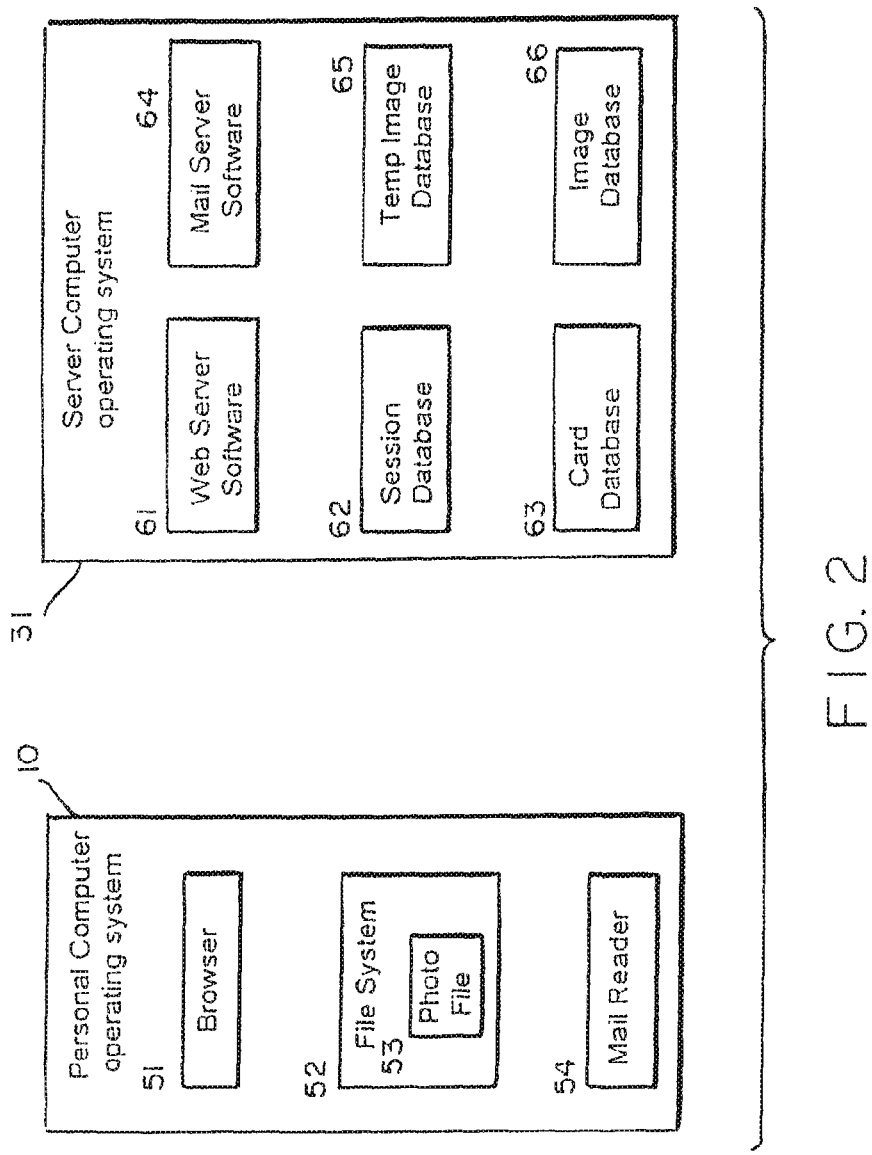
FIG. 2 is a simplified block diagram of a server and personal computer as found in FIG. 1, illustrating a portion of the functions utilized by the present invention.

With reference to FIG. 2, in the preferred embodiment a server 31 is a Pentium Pro (Intel Corporation, San Jose, Calif.) based computer connected to the Internet running the Linux operating system (Red Hat Software, Inc., Research Triangle Park, C) and the MetaHTML web server software 61 (Universal Access Inc., Santa Barbara, Calif.). The web server software supports the HTTP protocol—the standard used in World Wide Web interaction. When a request is made over the Internet to view a web page, the server responds to this request returning a reply in the form of text describing the page in the hyper text markup language (HTML) format. A user specifies the page he would like to view with a Uniform Resource Locator (URL), or web address.

Database on Server

The server 31 is adapted to store and process data that is transmitted over the Internet. The present invention utilizes two type of storage: temporary storage and permanent storage. The temporary storage keeps the data that is entered by the user during a "session" of interaction with the site. The temporary storage is called the Session Database 62. As the user makes changes to the postcard the data in the Session Database 62 is updated.

In order to manage the data for a particular user, each user is assigned a unique identification number that distinguishes that user's session from all others. This unique identification number is stored by the client via the web browser using a standard mechanism known as the "cookie mechanism." The identification number is used by the client as the key to the Session Database 62. While the cookie is stored on the client, writing of the cookie and recording and retrieving data from the Session Database 62 is handled by the server via the MetaHTML software.

The electronic postcard is composed of two data forms: textual and graphical. The textual data is stored in the Session Database while the card is being created. The graphical data (generated images and photographs) are stored in the file system of the server in a directory specifically created to store the temporary image files, herein designated as the Temp Image Database 65. In the preferred embodiment, the directory name utilizes the same cookie identification number although various other naming schemes are possible. By using the cookie in the directory name, the system ensures that each user has his own temporary directory. This directory can be thought of as an extension of the Session Database 62. The graphical data files are assigned names that are also stored in the Session Database.

After the electronic postcard is sent, the postcard data is stored "permanently" in two other databases. One database, called the Card Database 63, stores the sender's and recipient's name and email address. The other database, called the Image Database 66, stores the images that have been constructed for the front and back of the card. In the preferred embodiment, after the electronic postcard is sent and the data is stored in the Image Database 66, the temporary graphical data files and session data can be deleted. As an alternate embodiment, the temporary graphical data files may be retained for additional uses, such as creation of an album of images.

The data in both the Card Database 63 and the Image Database 66 is keyed by a unique identifier called the Card Key that is created at the time the card is sent. This key—the information required for retrieving the electronic postcard data from the Card Database 63 and Image Database 64—is sent to the recipient of the card in a message. As a result, the recipient has sufficient information for interacting with the server so as to view the specific electronic postcard identified by the Card Key. The Card Database 63 also stores the date that the card was sent and the number of times that the card has been viewed. The data for a card is typically stored for 14 days (the number of days is a number set when the system is configured, and is not a limitation of the server storage time). After that point the permanent card and image data may be automatically deleted. The data is also deleted after the card has been viewed 15 times (this number is also set when the system is configured). One of ordinary skill in the art can appreciate the possible variations for determining when to delete the data. As an alternate embodiment, the permanent card and image data may be retained for additional uses, such as creation of an album of images.

Like the Temp Image Database 65, the Image Database 66 uses the file system to store the image files. The files are stored in a directory whose name is derived from the Card Key. In this case, there is a separate directory created for each card that is sent.

Dynamically Generated Web Pages

The present invention is adapted to process text and graphic data to create an electronic postcard that is composed of custom generated HTML pages including generated images within the HTML pages. The system looks at the data it has stored from previous user inputs and creates the HTML page to achieve the custom look desired by the user. The user specifies the look by supplying the graphical data to upload, the style parameters for the look of the card and text for the textual content and address. Certain style characteristics may be automatically determined from the user data. For example, different HTML text is generated when the photo is horizontally oriented than when it is vertically oriented. Orientation is, in turn, determined by the aspect ratio of the graphical data uploaded by the user.

Figure 4:
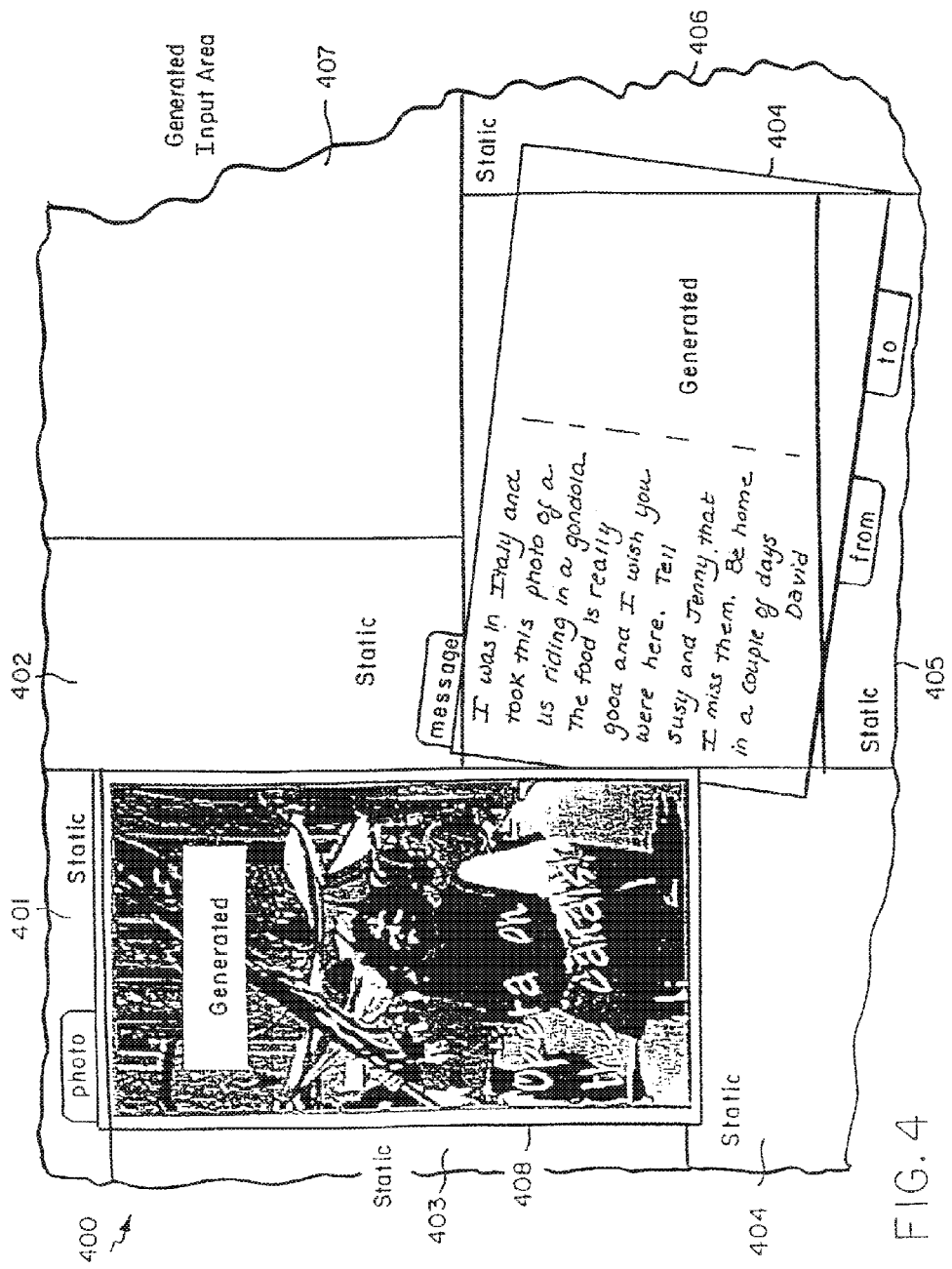
FIG. 4 is an example screen of the present invention indication the static and generated image areas.

The electronic postcard 400, as illustrated in FIG. 4, is composed of HTML pages consisting of tables, with some cells of the table containing static images and some cells containing generated images. Static images 401 to 406 are created once and do not change during further modifications to the postcard. Generated images 407 through 409 change during the customization of the postcard and are thus regenerated as required. The use of static and generated images improves the efficiency of the system by preventing the recreation and retransmission of images that are essentially "fixed" during operation of the system.

When a user enters text or makes a style selection, this input is sent to the server and is stored and processed using code residing on the server. This process uses a scripting language such as MetaHTML or Dynamo (Art Technology Group, Boston, Mass.) (detailed algorithms of this process are outlined below in the "Use" section). The server then sends to the client a new HTML page containing the updated information and regenerated images. In order to improve operation of the system, only those sections of a displayed page are updated during an update of the information. Thus, only the images of the portion of the display that depend on the changed data will be regenerated and retransmitted. For example, referring to FIG. 4, generated portion 408 includes a caption and therefore portion 408 will be regenerated and retransmitted if the caption text data is modified.

Client

With reference to FIG. 1, in the preferred embodiment the user or client computer 10 is a personal computer that is connected to the Internet. The computer can be a Apple Macintosh (Apple Computer, Inc., Cupertino, Calif.), an IBM-compatible machine (IBM Corp., Armonk, N.Y.) or any other computer capable of running a standard web browser. The client connects to and communicates on the web using the TCP/IP protocol. The actual physical connection is not critical for the present invention, and may be accomplished via a dedicated line or a modem via a dialup connection. Turning to FIG. 2, in the preferred embodiment, the user computer 10 runs the Microsoft Windows 95 operating system (Microsoft Corporation, Redmond, Wash.) and a browser 51 such as Netscape Navigator (Netscape Communications Corporation, Mountain View, Calif.) or Microsoft Internet Explorer (Microsoft Corporation, Redmond, Wash.). The browser may be further augmented for supporting the Java language (Sun Microsystems, Inc., Mountain View, Calif.) to enable the browser to support processing local to the client.

The browser 51 is the application running under the operating system on the client computer that allows the user to make style selections, enters text and uploads photos. The browser 51 displays the pages received from the server 31 and collects user input for transmission to the server 31. The pages in the preferred embodiment are written in standard HTML capable of being displayed on the web browser with no additional plug-ins or other applications.

Graphic data uploaded by the user at the user computer 10 may be supplied front a variety of sources. For instance graphical data representing drawings created by programs such as Corel Draw (Corel Corporation, Ottawa, Ontario, Canada), Adobe Illustrator or Adobe Photoshop (both of Adobe Systems Incorporated, Seattle, Wash.) can be used as image data for uploading. For graphical data representing digital photos, various sources of data are possible. As illustrated in FIG. 1, the user computer can receive data from a digital camera 15, video camera 14, scanner 12, or from a film processor who provides electronic image data. In addition to the different sources, a variety of graphical data formats can be used to encode the image information. In the preferred embodiment, graphical data is provided in the JPEG or GIF format.

In the preferred embodiment of the present invention, a separate client computer, such as user computer 21 of FIG. 1, may be the receiver of the electronic postcard. For reception of the electronic postcard, the receiving computer should have access to an email account and be able to send and read email using a standard email reader such as Eudora (QUALCOMM, Inc., San Diego, Calif.) or Netscape Navigator.

Operation of the System

As illustrated in FIG. 17, the electronic postcard has the familiar "look and feel" of a standard postcard, with a photo on one side and a personalized message and recipient's name on the other. The user fills in the electronic postcard with personalized information: recipient's name, message, signature; and uploads a photo selected by the user that will appear on the card. After the user has specified the information to appear on the electronic postcard, an email message is automatically sent to the recipient notifying them of the card.

Connect the Computer to the Internet

The electronic postcard user must first connect their personal computer to the Internet using a modem and a telephone line. Using standard SLIP or PPP software the user instructs the modem to dial an Internet Service Provider. When the connection is made and all of the protocol hand shaking has completed, the user then connects to the server where they can create their electronic postcard.

Go to a Site that Offers Electronic Postcard

With an Internet connection the user can now use standard web browser software (such as Netscape Navigator or Microsoft Internet Explorer) to access a site that offers the electronic postcard service using the URL specific to this site.

The Initial Web Page Shows Both Sides of a Blank Postcard

Figure 6:
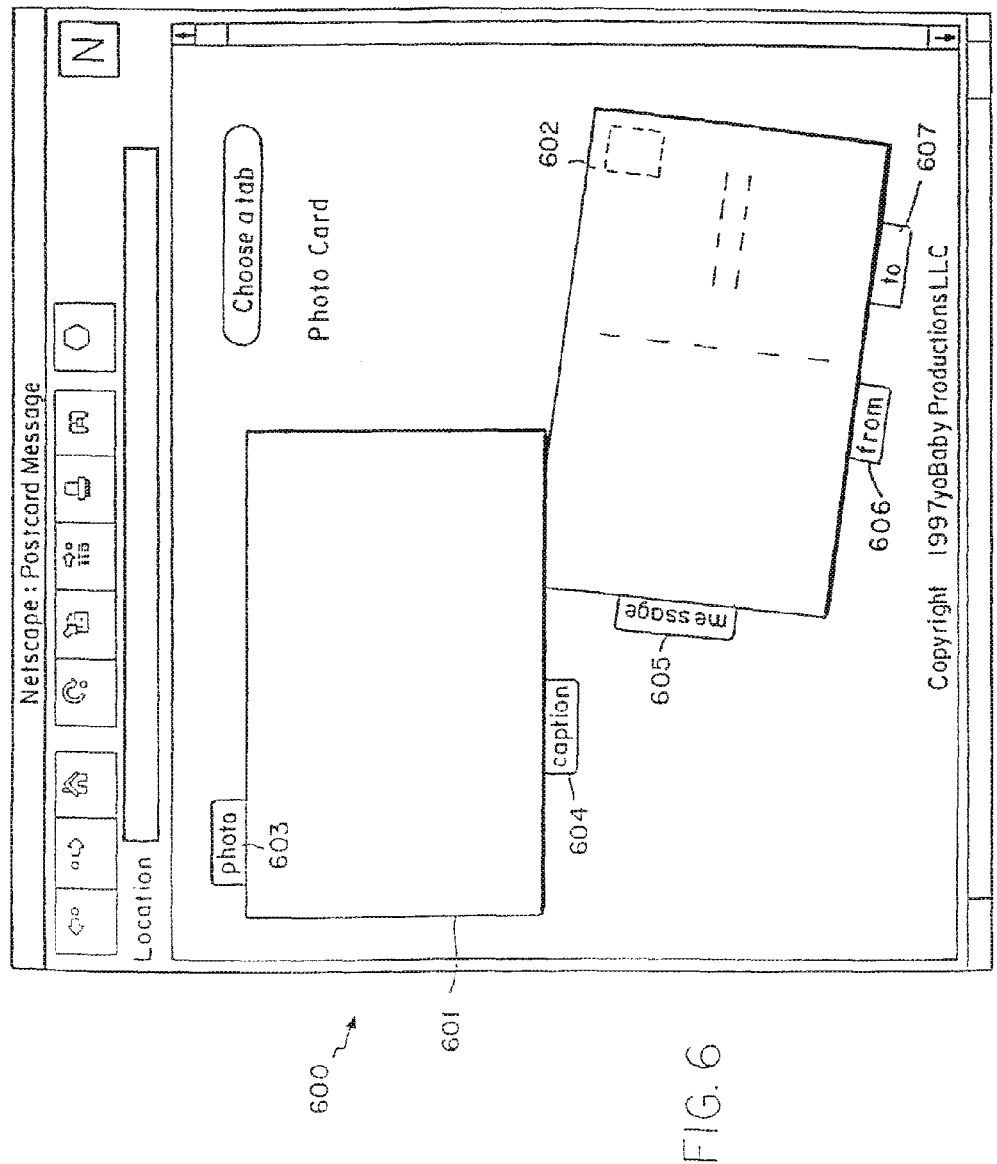
FIG. 6 is an image of the present invention electronic postcard creation page, as displayed within a browser window, where the electronic postcard is empty of user information.

When the user first comes to the site the initial web page, as illustrated in FIG. 6, is a blank electronic postcard 600. The layout shows both the front 601 and the back 602 of the postcard 600 on one screen. The front 601 will hold the photo and a brief caption describing the photo. The back 602 will have the recipient's name, the message text and the sender's signature and optionally a postmark indicating the time and date of sending. Both sides initially do not contain personal content, but have background graphics that resemble a classic blank postcard.

Choose a Tab to Fill in Part of the Electronic Postcard

The user adds their personal information to the electronic postcard by clicking the tabs 603 through 607 that surround the front 601 and back 602 of the card 600. The tabs 603 through 607 correspond to the different parts of the postcard that the user can fill in: sender's name and email address 606, recipient's name and email address 607, message to the recipient 605, a user-selected photo 603, and a photo caption 604. When the user clicks a tab a new web page appears that contains a form with input fields for the selected part of the card. There is a different page for each tab. As an alternative embodiment other indicators could be used, for instance a sequential list of steps or a fixed sequence of steps could be implemented to complete the electronic postcard.

Specifying the Parts of the Electronic Postcard

The user clicks one of the tabs 603 through 607 to bring up the page that corresponds to that part of the electronic postcard. The page will contain a form that prompts the user to enter the information that will appear on the card. The user fills in the fields in the HTML form and clicks the OK button to transmit the data to the server computer. The transmission is handled through a standard HTTP Form POST request. The server processes the fields from the POSTed data and validates the information. If the information is valid it is stored in a field in the session database. If the information is not valid the user is redirected to an error page which describes the problem.

When the information in the session database changes, the server regenerates the postcard and the new information appears on the postcard. This process can also be used to change a field that has already been entered. The card is always displayed with all of the latest information in the correct locations.

Figure 7:
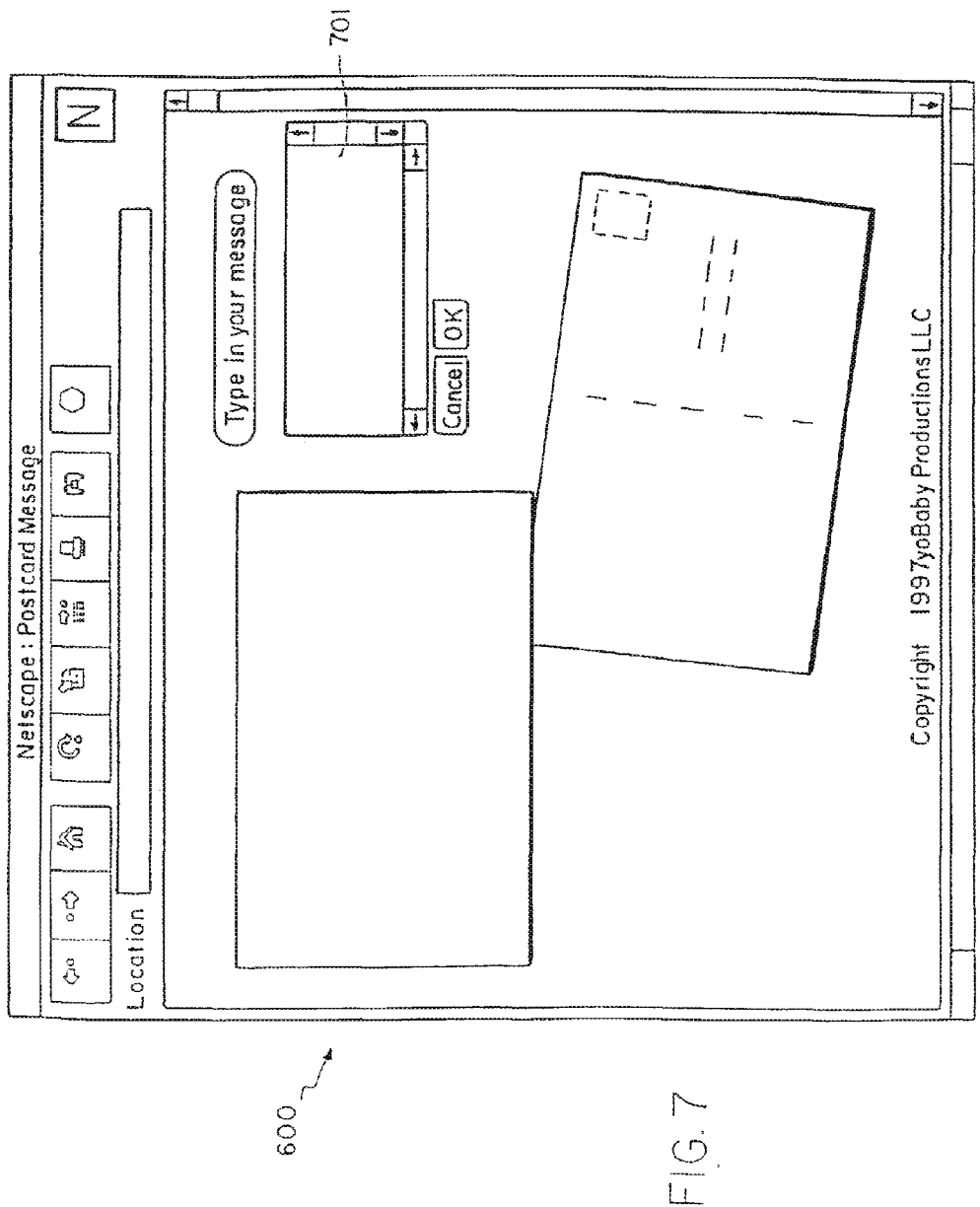
FIG. 7 is an image of the present invention electronic postcard illustrating the prompt for a message.
Figure 8:
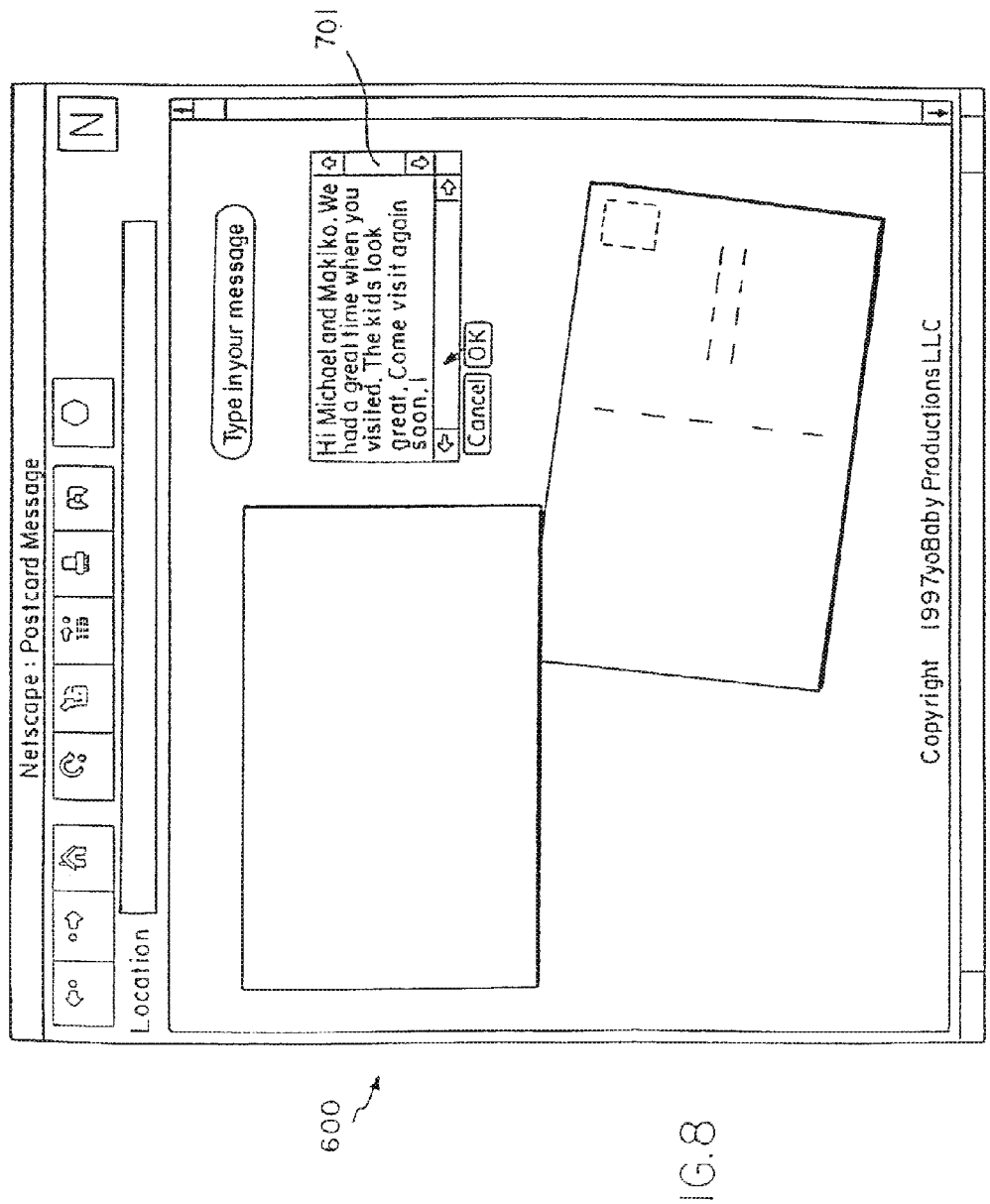
FIG. 8 is an image of the present invention electronic postcard illustrating the input of a message.

FIG. 7 illustrates the display after selecting the message tab 605. The electronic postcard generates a prompt 701 for the user to input a message for display on the back of the postcard 600. FIG. 8 illustrates the input of an example message in the prompt 701.

Figure 9:
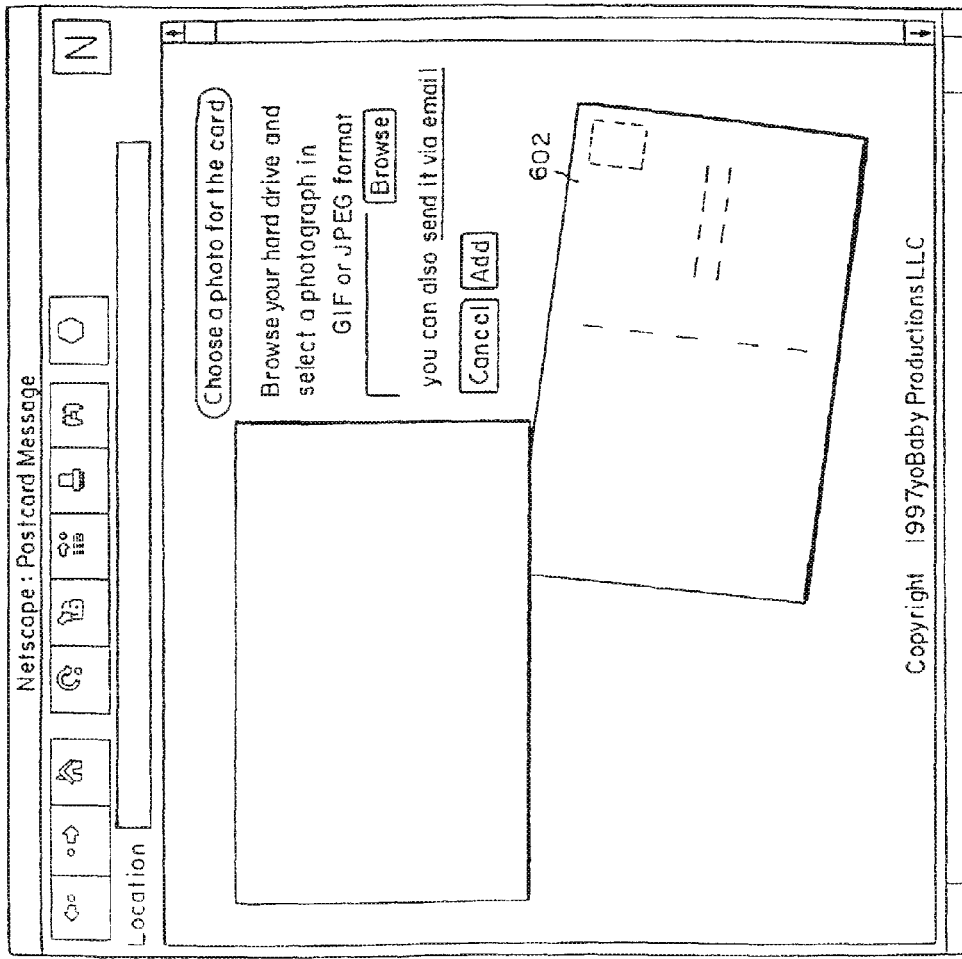
FIG. 9 is an image of the present invention electronic postcard illustrating the prompt for input of an input image.
Figure 10:
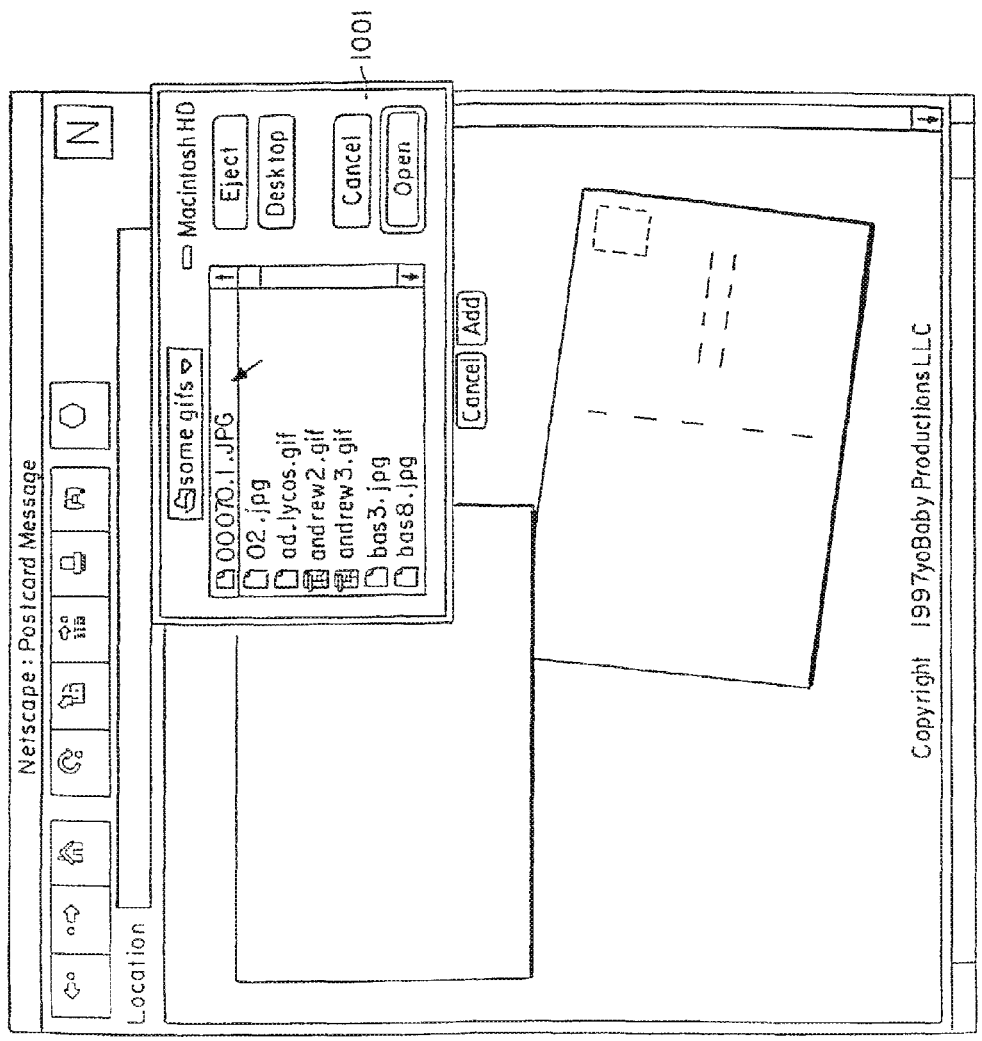
FIG. 10 is an image of the present invention electronic postcard illustrating the selection of an input image.

FIG. 9 illustrates the back of the card with the message rendered onto the postcard back image. The specific steps for creation of the rendered postcard back image is discussed below. FIG. 9 also illustrates the prompt 901 for a photograph after selecting the photo tab (603 of FIG. 6). If the name of the file containing the photograph is known it may be entered, or the user may browse for the file 1001 as illustrated in FIG. 10.

Figure 11:
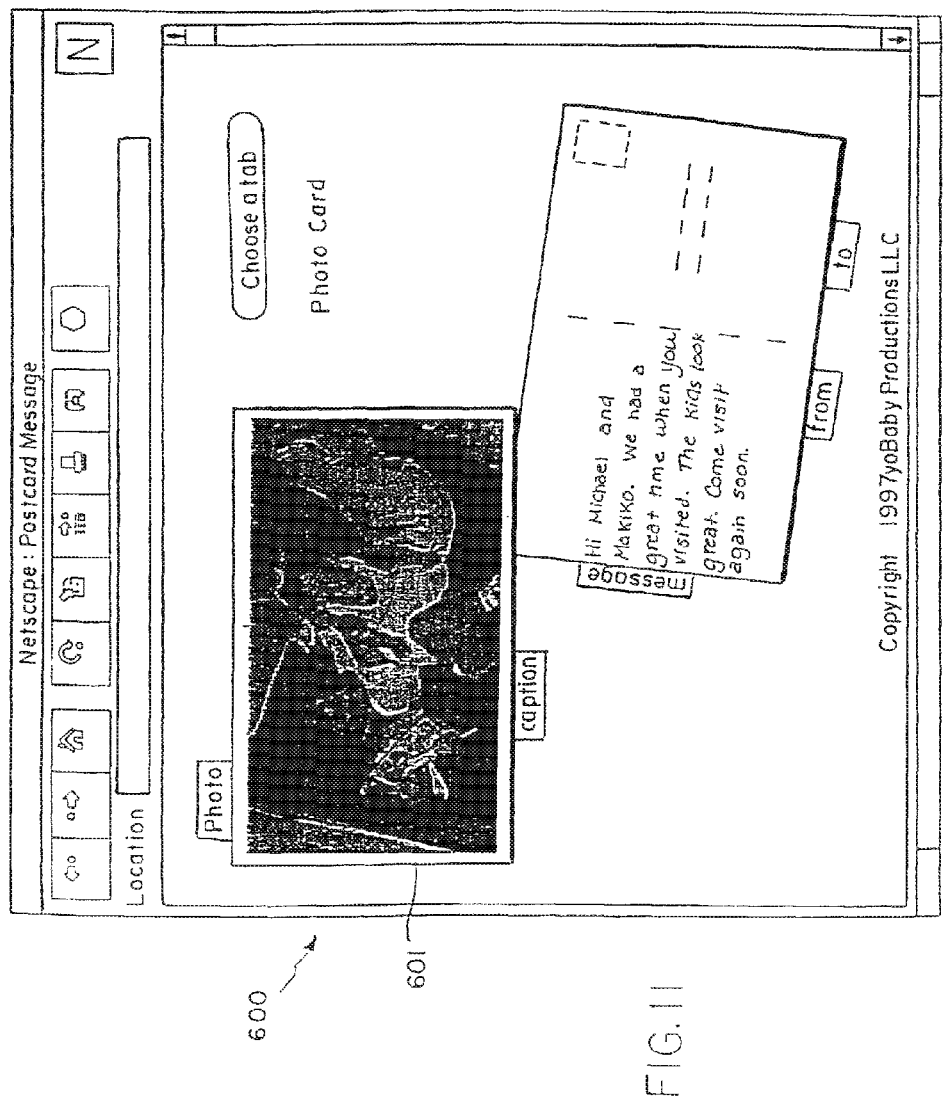
FIG. 11 is an image of the present invention electronic postcard illustrating the input image placed on a side of the postcard.

FIG. 11 illustrates the electronic postcard after the photo has been uploaded to the server and processed by the server. The steps for processing the photograph are described in detail below. The front of the postcard 600 now has the photograph placed onto the front 601.

Figure 12:
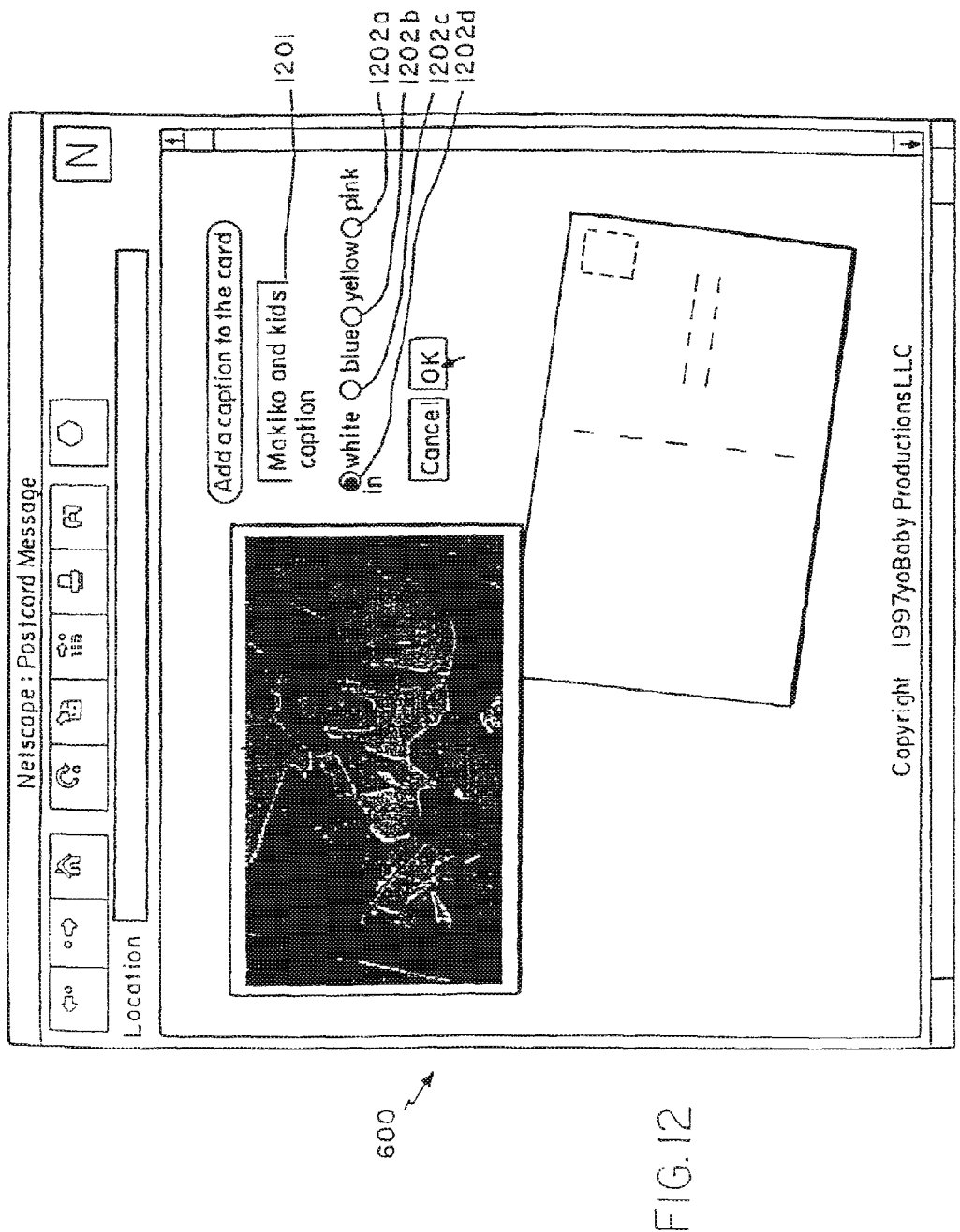
FIG. 12 is an image of the present invention electronic postcard illustrating the prompt for an image caption.
Figure 13:
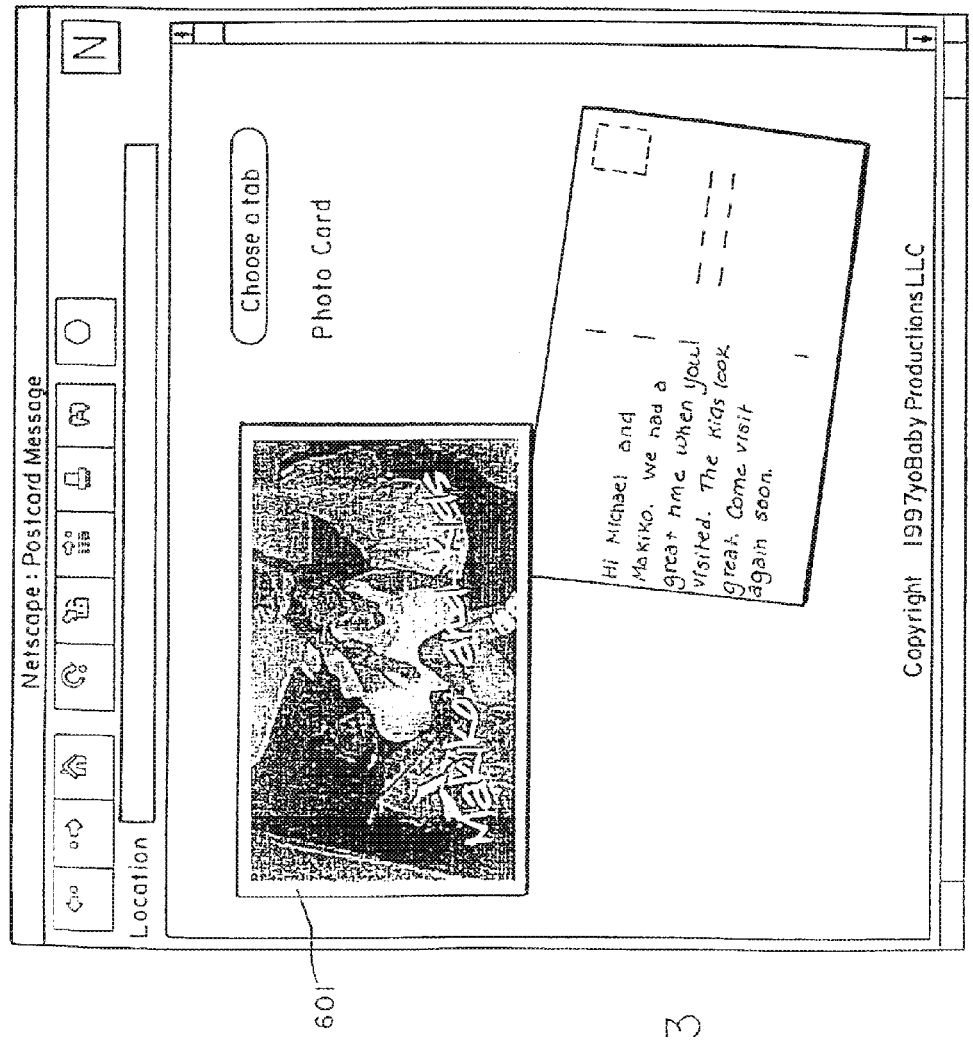
FIG. 13 is an image of the present invention electronic postcard illustrating the composite created from the input image and image caption.

The front of the electronic postcard may also include a caption by selecting the caption tab 604 of FIG. 6. The system then displays a prompt for the caption 1201 as seen in FIG. 12. The caption 1201 may be displayed in a variety of colors by selecting a color via buttons 1202*a, b, c,* or *d*. In the example, the button for "white" has been selected. FIG. 13 illustrates the caption rendered onto the front 601 of the postcard 600.

Figure 14:
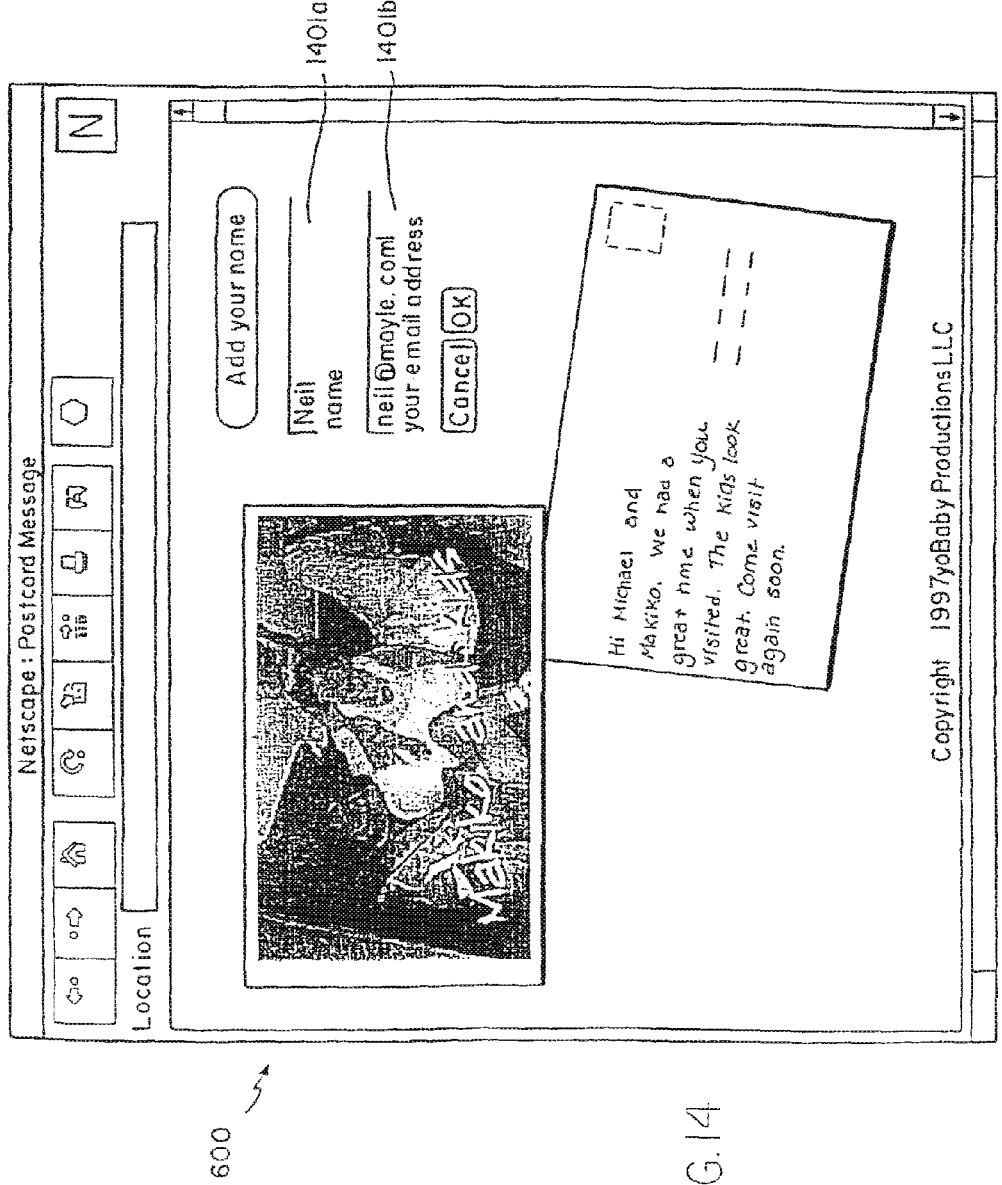
FIG. 14 is an image of the present invention electronic postcard illustrating the prompt for the sender's name and address.
Figure 15:
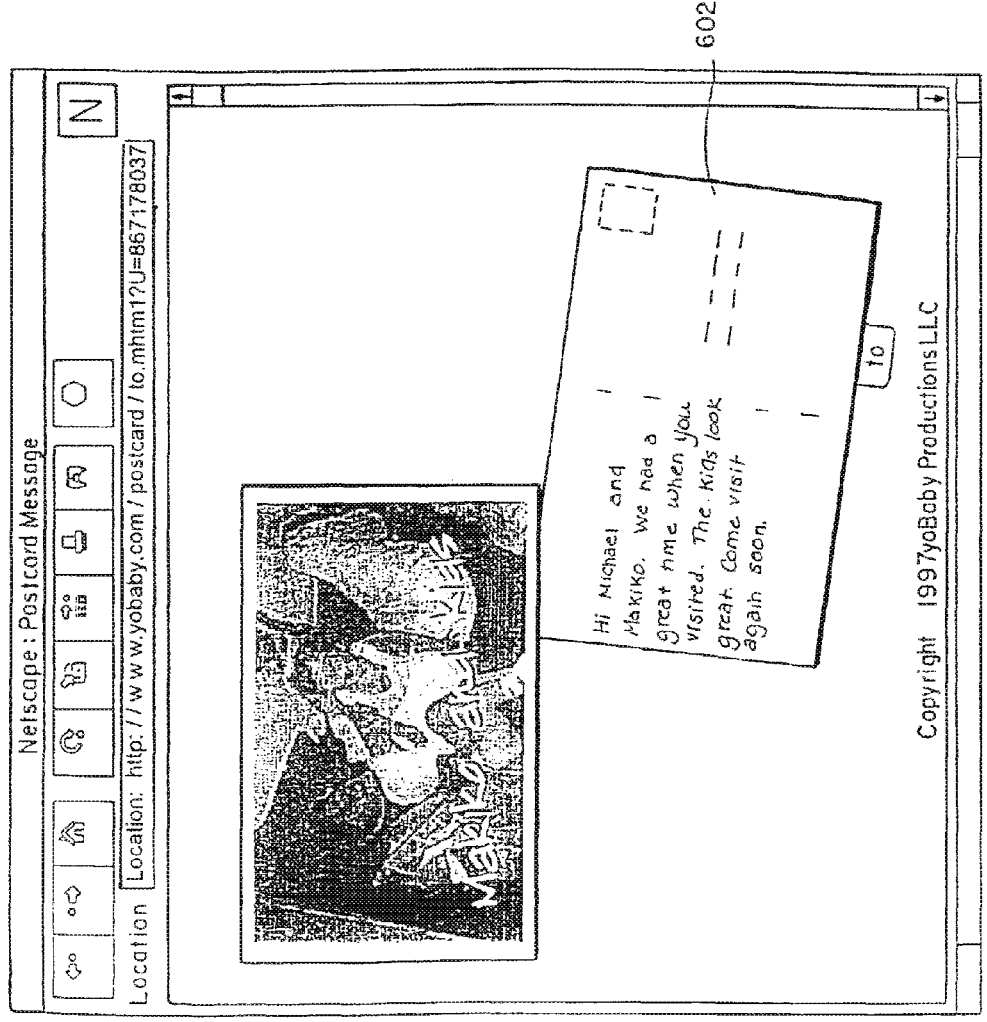
FIG. 15 is an image of the present invention electronic postcard illustrating the prompt for the recipient's name and address.

The final information needed for the postcard is the sender's and recipient's name and email address. FIG. 14 illustrates the electronic postcard system prompting for the sender's name after selecting the from tab (606 of FIG. 6). The user specifies the name 1401*a* and the email address 1401*b* in the fields. The name is used for signing the postcard. The email address is used for facilitating further communications between the sender and the recipient. FIG. 15 illustrates the electronic postcard 600 with the senders name rendered onto the back 602.

Figure 16:
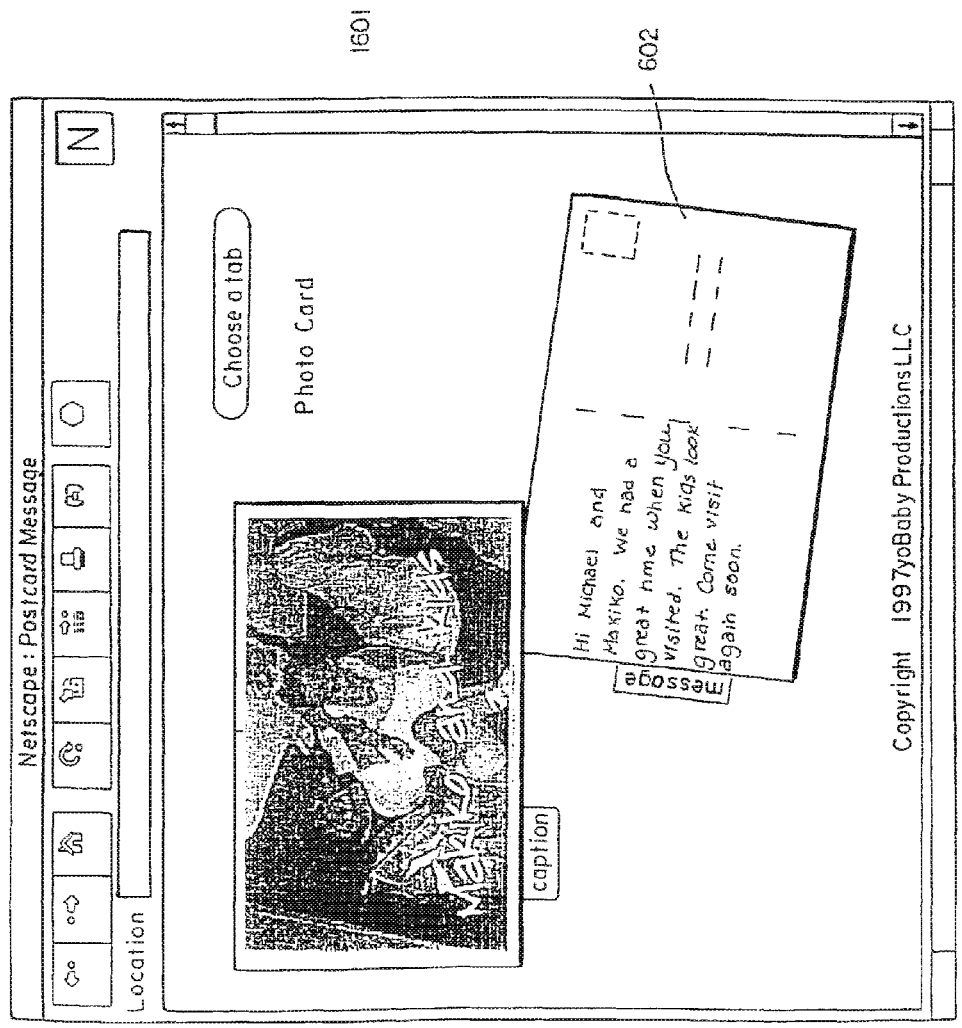
FIG. 16 is an image of the present invention electronic postcard illustrating the completed postcard prior to sending to the recipient.

FIG. 15 also illustrates the prompt for the recipient's name and email address after selection of the to tab (607 of FIG. 6). The user specifies the name 1501a and the email address 1501b in the fields. The name is used for addressing the postcard. The email address is used for sending the Card Key to the recipient. FIG. 16 illustrates the electronic postcard 600 with the recipient's name rendered onto the back 602. At this point the electronic postcard is ready to be sent or the user may select any one of the tabs to correct or change the postcard.

FIG. 17 illustrates the card as sent to the recipient. The front 601 of the postcard 600 contains the photograph and caption. The back 602 contain the message, name of sender and name of recipient. In addition, a "stamp" 1701 and "postmark" 1702 have been added to the back 602. The postmark 1702 contains the date and optional information such as location or advertisement rendered onto the card. The stamp 1701 contains a logo that can be selected by the user or generated by the system. If generated by the system, it may contain advertisement material specified by the operator of the electronic postcard server. When the system sends the card, a notice 1704 is given to the user that the postcard was sent. The user may then create another card by selecting one of the buttons 1703a or 1703b.

Generating the Back of the Postcard

Figure 3A:
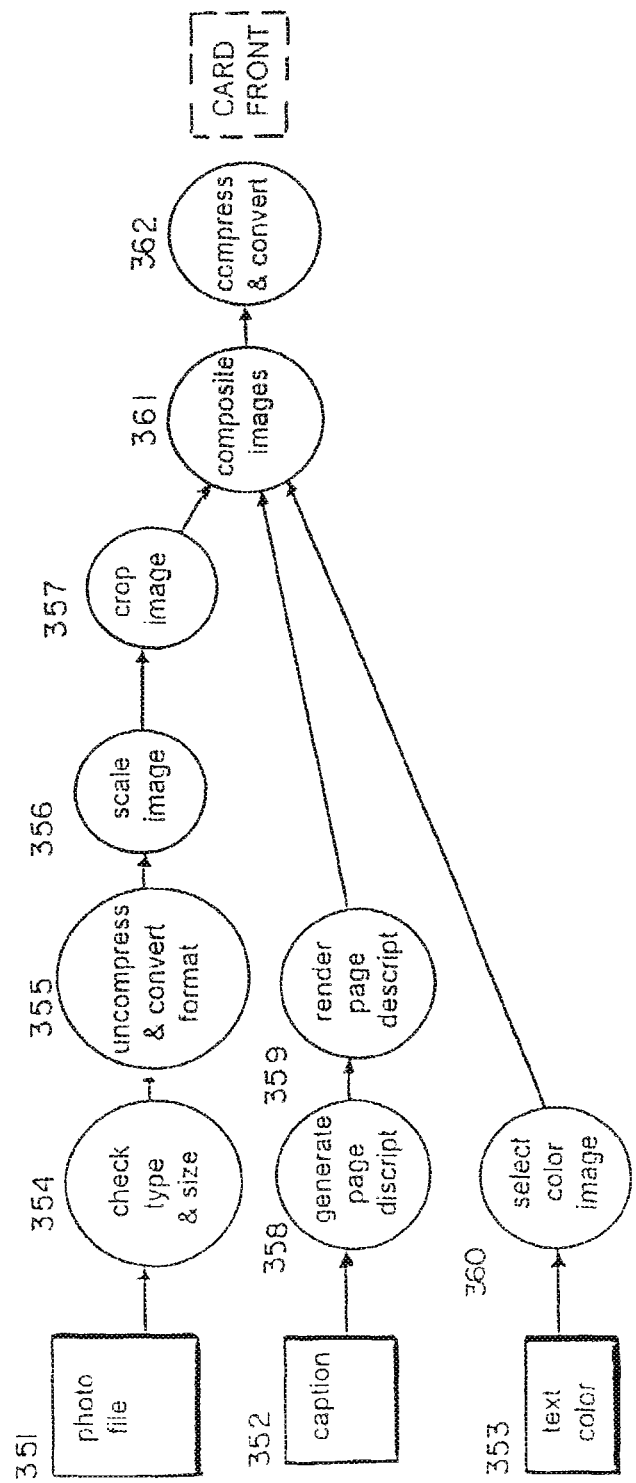
FIGS. 3A and 3B are flowcharts of the steps executed by a personal computer of the present invention in creating the front and back of an electronic postcard.
Figure 3B:
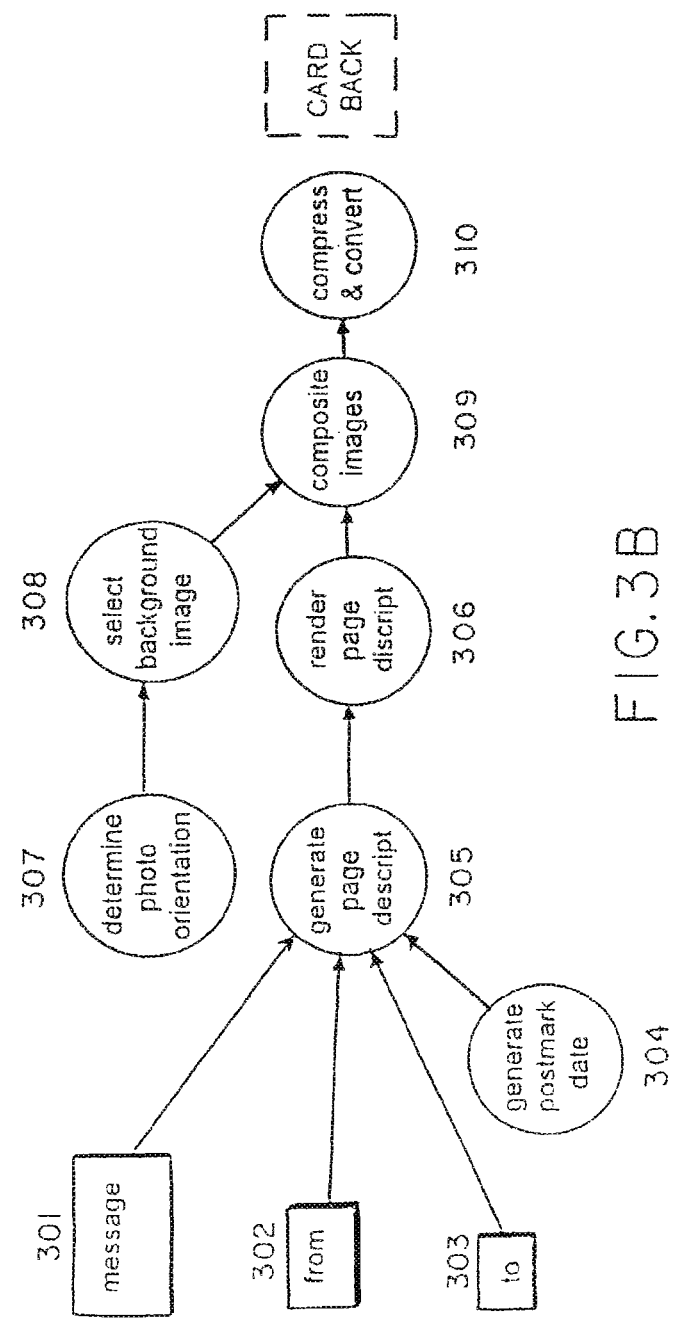

The back of the postcard, which contains the message, recipient's and sender's names, is generated by a sequence of steps illustrated in FIG. 3B:

Generate postmark date string 304: After the card has been the sent the back of the card shows a postmarked stamp. The postmark shows the date that the card was sent and may include optional text. This information is stored in the Session Database when the user sends the card. It is formatted in a style appropriate for a postmark.

Determine the orientation of the postcard 307: The front of the postcard can be displayed in two different orientations, depending upon the aspect ratio of the image uploaded by the user. If the photograph is taller than wide the postcard is shown with the card front displayed vertically. If the postcard is wider than tall than the front of the card is displayed horizontally. The orientation of the front impacts the back of the postcard in the preferred embodiment.

Select background image 308: There are two different images used for the blank card back. In both images, the front of the postcard is shown slightly overlapping the back of the postcard. Through the use of shadows the front of the postcard is made to look like it is in front of the back of the postcard. The shadow that is cast on the back of the postcard is different for the two different orientations of the back of the postcard. In the upright portrait orientation as seen in FIG. 4, the overlap of the front onto the back is at the low left edge of the back. In the landscape orientation, as illustrated in FIG. 8, the overlap of the front onto the back is on the upper right edge of the back.

Generate page description file 305: The layout of the text on the back of the card is described using a page description language, such as Postscript. The page description is coded to size and position the text fields (the text specified by the user for the message operation 301, recipient's name and email address operation 302, sender's name and email address operation 303, and postmark operation 304). It also contains code to break the message text into lines (line-wrapping) so that it fits in the appropriate area of the card. All of the text on the back of the card is drawn in a handwriting-style typeface, but could be drawn in a different prespecified typeface or a typeface selected by the user during operation of the system.

Render page description 306: The page description is converted to a gray scale image using a rasterizing engine such as the Ghostscript Postscript interpreter (Red Hat Software, Inc., Research Triangle Park, N.C.). The result is called the text image.

Figure 5:
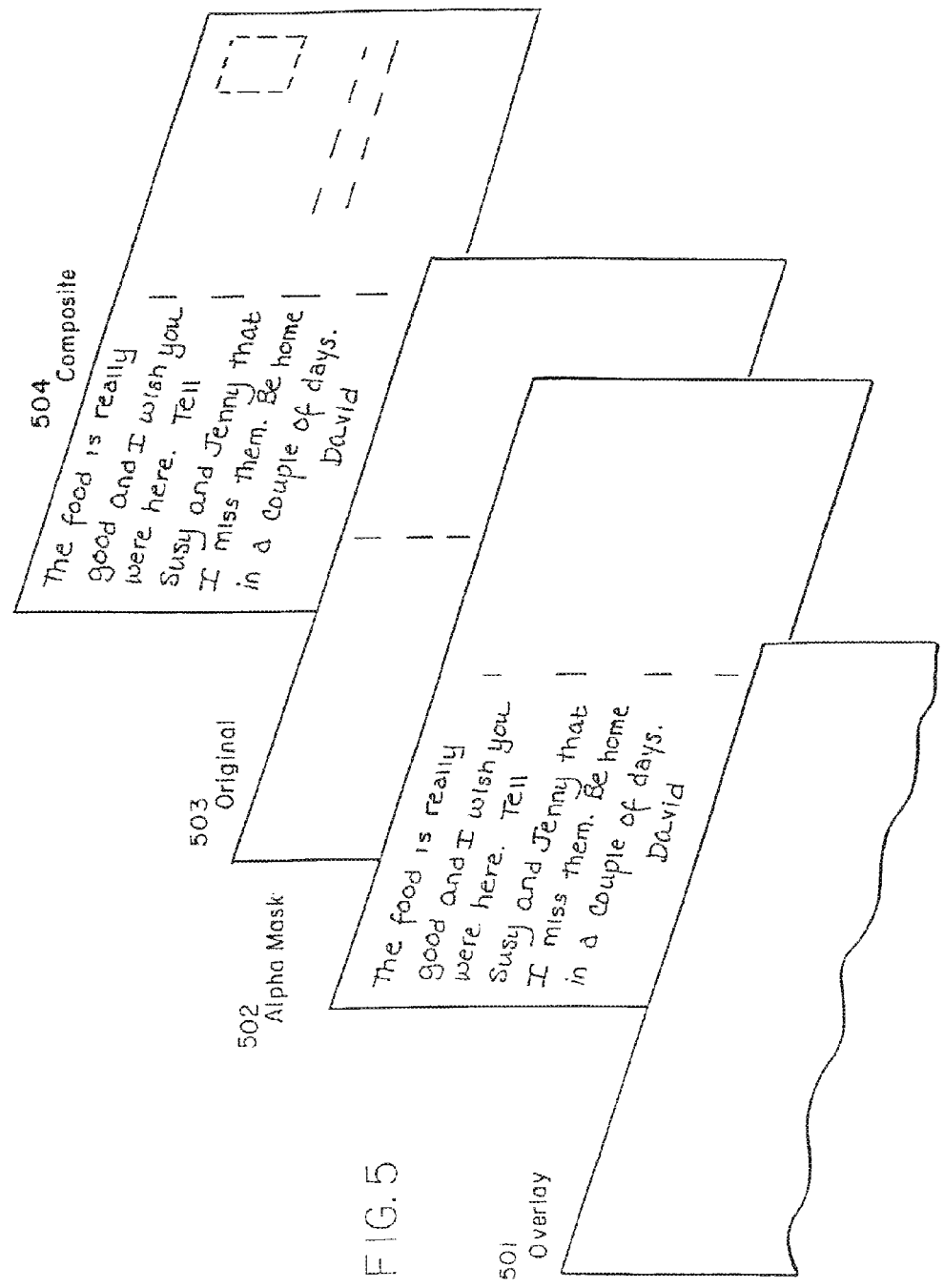
FIG. 5 is a diagram illustrating the process of creating a generated image area and particularly the compositing of text on an image.

Composite text image and card back background 309: The text image is combined with the card background using a compositing routine. FIG. 5 illustrates the process for compositing a message and sender's name onto the postcard back. An all black image is used as the overlay 501, the text image is used as the alpha mask 502, and the card background is used as the original 503.

The result is that:

at any pixel that the text image 502 is black the overlay is passed through and the resulting image 504 is the overlay 501, in this example black. at any pixel that the text image 502 is white the resulting image 504 is the same as the background image 503 at the corresponding pixel location. at any pixel that the text image 502 is gray, the resulting image 504 is a mixture of the overlay 501 (black) and the content of the background image 503 at the corresponding pixel. The exact mix depends on the gray level of the text image pixel.

Compress and convert the image 310: The resulting image is finally compressed and converted into an image format viewable in a web browser (such as GIF or JPEG format). The result of this process is an image that shows the generated portion of the back of the postcard with the user's text displayed in a handwriting style typeface. FIG. 17 illustrates a completed postcard back 602.

Upload Photo

The photo tab is handled differently from the other tabs. With reference now to FIG. 3A in the photo file operation 351, the user specifies a file on the local client computer that holds the image data he or she wants to use on their card. The photo should be in JPEG or GIF format. The file name is specified using an HTML form with an INPUT field of type FILE. This field type is supported by Netscape Navigator browsers. The FORM data is POSTed to the server when the user clicks the OK button. The file contents are included with the form data and is received on the server.

On browsers that do not support INPUT fields of type FILE, the photo is transferred as an email attachment. The email is sent to a special address (e-g. picturedrop.yobaby.com) on the server site that is used for transferring pictures. The name part of the address would encode the specific session that the photograph is associated with. A mail server running on that electronic postcard server treats mail to this address specially. For example in a mail server such as Sendmail this is handled by a rule for a special host. The rule pipes the message to a program that decodes the session id out of the recipient name and decodes the message body. The program could be written in a scripting language like Perl and the message could be decoded using a Unix program such as MUNPACK. The program writes the decoded image file to the Temp Image Database directory associated with the session.

Processing Photo and Generating Postcard Face

When a photograph is received on the server the Electronic postcard server software processes the photo using several steps as illustrated in FIG. 3A:

Check size and type 354: The image data that is POSTed to the server must be in a size and format that the electronic postcard software can handle. The first step is to check the byte count of the data sent to the server. If the byte count exceeds some limit then the image is ignored and the user is redirected to an error page. Next the image data is saved as a temporary file and the type of the file is checked. The type is checking by examining the header bytes of the file which encode the file type. This is done use a program like the Unix command file. If the type is not one of the types supported by electronic postcard then the file is deleted and the user is redirected to an error page.

Uncompress and convert format of photograph 355: The image data that is received front the user is typically in a compressed format. It can be in one of several formats. To more easily manipulate the image the server first converts it into a uniform uncompressed format such as Portable PixMap File Format (PPM), The conversion can be done using standard translation tools such as are contained in the Unix NetPBM library (software distributed front Washington University, St. Louis, Mo. as found in the directory specified by the URL http://wuarchive.wustl.edu/graphics/graphics/packages/NetBPM).

Scale the photograph 356: The front of the postcard is a fixed size and the image must be scaled to fit this size. There are two different versions of the front of the card; one for each orientation. If the photograph is wider than tall then the horizontal (landscape) version is chosen. If the photograph is taller than wide then the vertical (portrait) version is chosen. Another problem is that the aspect ratio of the photograph may not exactly match the aspect ratio of the chosen card. The photograph is scaled so that one dimension exactly matches the desired size for the card and the other dimension is always larger than the card or exactly the same size.

Crop the scaled photograph 357: If after scaling one dimension of the photograph is larger than the desired size for the card, the photograph must be cropped to fit onto the card. Since the aspect ratio of most pictures is similar (roughly 5.times.7) and the card is designed with approximately the same aspect ratio, the cropping is usually not significant. The cropping is done so that excess is removed equally front both ends (top and bottom or left and right) and the picture ends up centered on the postcard. The cropping can be done use a standard graphics routine such as Unix command pnmcut.

Generate page description file 358: The layout of the text input during the caption operation 352 is drawn on top of the photograph is described using a page description language, such as Postscript. The page description is coded to size and position the caption text. It also contains code to break the caption text into lines (line-wrapping) so that it fits in the appropriate area of the card.

Render page description 359: The page description is converted to a gray scale image using a rasterizing engine such as the Ghostscript Postscript interpreter. The result is called the caption image.

Select text color image 360: The user selects the color in the text color operation 353 that they want to use for the caption text. Associated with each color is an image file that is filled with that color and is the size of the postcard front.

Composite caption image, text color and cropped photograph 361: The caption image is combined with the scaled and cropped photograph using a compositing routine. This operation is similar to the composite text image and card background operation 359 of FIG. 3B and illustrated in FIG. 5 as discussed above. In this case, the gray scale caption image is used as the alpha mask, the text color image is used as the overlay and the photograph is used as the original. The result is that:
at any pixel that the caption image is black the resulting image is the desired text color. at any pixel that the caption image is white the resulting image is the same as the photograph at the pixel location. at any pixel that the caption image is gray, the resulting image is a mixture of the text color and the content of the photograph at the corresponding pixel. The exact mix depends on the gray level of the caption image pixel.

To make the caption text stand out more from the photograph, the caption text is drawn with a contrasting "shadow". This is done via two compositing steps. Each step works as described above. The first compositing step uses the shadow color (typically black) as the overlay, the caption image as the alpha mask, and the photograph as the original. The second compositing step uses the text color selected by the user as the overlay, the caption image as the alpha mask and the result of the first step as the original. The shadow is composited with a slight offset so that it appears below and to the right of the caption.

Compress and convert the image 362: The resulting image is finally compressed and converted into an image format viewable in a web browser (such as GIF or JPEG). The result of this process is an image that shows generated portion of the back of the postcard with the user's text displayed in a handwriting style typeface.

Sending the Card

When a photo, sender, recipient and message have been specified the card is complete and can be sent. When the user clicks on the "Send" button the server creates a card key, saves the card into the Permanent Database and sends an email message to the recipient.

The contact information and the images are saved in the Permanent Database. The images for the front and back of the card are saved into the Image Database. The back of the card now includes a postmarked stamp. As already noted, the postmark is for the date the card was sent and the stamp can advertise the sponsor/host of the site. The sender's name, sender's email address, recipient's name and recipient's email address are saved into the Card Database. The date that the card was sent is also saved. The email message that is automatically sent to the recipient states that there is a card available on the web site for the recipient and that it can be viewed by opening the specified URL. The URL includes the Card Key that uniquely specifies that particular electronic postcard.

Viewing the Card

The recipient may view the card as soon as they receive the email message with the URL. The recipient will use a web browser to enter the URL, and view their personalized page.

Variations

While the preferred embodiment described above is directed to an electronic postcard, the system is not so limited. The present invention may apply to a variety of systems that require the user to upload image information for processing by the server into a display for viewing and to optionally provide a notice mechanism so as to alert an audience as to the availability of the created display. The present invention can be applied to create a variety of image processing systems, varying according to the degree of structure imposed on the system, the period of storage and the number of individuals to notify. For instance, the present invention can be modified to create:

Photo Contest: In this embodiment of the system, the user can upload an electronic image onto the server where a minimal amount of structure is imposed (possibly including scaling and format conversion). The image data may be stored only for a short time, as long as the contest is open. Once uploaded, the system would send a notice (including the image identifier) to the judge or judges notifying them of the entry of the new electronic image.

Baby Journal In this embodiment of the system, the user can upload an electronic image onto the server of a child or infant. The server may impose a fixed structure (i.e. a specific frame and format for the page holding the image) or allow a variety of structures for the user to select from. The image data could be retained for a long period, if not permanently. Once uploaded, the user can specify one or more recipients to receive notice of the new image, inviting them to visit and view the display. Thus, an album could be created for a child, holding a variety of images of the subject for a long period.

Family Album: In this embodiment of the system, the one or more related users can upload an electronic images. The server may impose a fixed structure (i.e. a specific frame and format for the page holding the image) or allow a variety of structures for the user to select from. The server may also segregate the electronic image displays according to each user (i.e. family member) while keeping a relation between all of the displays (overall family album). The image data could be retained for a long period, if not permanently. Once uploaded, the users can specify one or more recipients to receive notice of the new image, inviting them to visit and view the display. Thus, an album could be created for an entire family, holding a variety of images of the family in a structured album. The system may be further extended to allow visitors to comment on the photos, with the system storing the comments in a database for display with the images.

In all of the above embodiments, the system can provide a variety of processing (e.g. captioning, formatting, storing, transmitting, centering, cropping, flipping, antialiasing, scaling, compressing, filtering, color correcting, adding special border and/or corner motifs, blurring, adding visual effects etc.) The embodiments can further be adapted to provide additional processing by the client computer of the electronic image data and/or the display. For example, the system could be modified to allow the user to drag the client computer's mouse to re-center the picture on the front of the postcard. Software, running on the client, could update the display to show the re-positioned photograph. The display update could proceed while the mouse is being dragged, without communicating with the server computer. Software running on the client computer can also preview the result of the various other types of image data processing e.g. scaling, filtering, color correcting, compositing text, etc. The result produced as result of this processing on the client computer could be at the same resolution as created by the server computer or it could be a lower quality so as to minimize processing time for the preview, thus allowing the server to actually produce the final processed information. The client computer software can be implemented in the Java language so as to run within a Java enabled browser It should be understood that other embodiments could be created with variations in function, layout and look. Although the present invention has been described in detail with reference only to present preferred embodiments, it will be appreciated by one of ordinary skill in the art that various modifications can be made without departing from the invention. Accordingly, the invention is limited only by the following claims.

The invention claimed is:

1. A method, comprising:
   storing, in a first memory device, image data uploaded from a computing device;
   storing, in a second memory device, information related to the image data received separately from the image data;
   generating a locator on a network configured to identify a storage location of the image data and the information; and
   providing the locator in a message.

2. The method of claim 1,
   wherein the image data is representative of a place, object, event, or experience; and
   wherein the information includes a description of the place, object, event, or experience.

3. The method of claim 1, wherein the image data is uploaded from the computing device using a graphical user interface.

4. The method of claim 1, wherein the locator comprises a uniform resource locator (URL).

5. The method of claim 1, further comprising generating a display of the image data and the information in response to a request that includes at least a portion of the locator.

6. The method of claim 1, wherein providing the locator in the message further comprises forwarding the message to a recipient.

7. The method of claim 1, further comprising modifying the image data or the information.

8. The method of claim 1, wherein the first memory device is distinct from the second memory device.

9. A server, comprising:
   a memory device configured to store instructions; and
   a processing device configured to execute the instructions stored in the memory device to:
      cause storage of image data received from a first source device in a first database;
      cause storage of information related to the image data received from a second source device in a second database;
      generate a uniform resource locator (URL) configured to locate the image data and the information; and
      include the URL in a message.

10. The server of claim 9, wherein the processing device is further configured to generate a display of the image data and the information in response to a request that includes at least a portion of the URL.

11. The server of claim 9,
    wherein the image data is representative of a place, object, event, or experience; and
    wherein the information includes a description of the place, object, event, or experience.

12. The server of claim 9, wherein the processing device is further configured to transmit the message to a recipient.

13. The server of claim 9, wherein the processing device is further configured to modify the image data or the information.

14. The server of claim 9, wherein the first database is distinct from the second database.

15. The server of claim 9, wherein the processing device is configured to store locator with the image data in the first database or the information in the second database.

16. A memory device having instructions stored thereon that, in response to execution by a processing device, cause the processing device to perform operations comprising:
    causing storage of image data uploaded from a computing device in a first database;
    causing storage of information related to the image data received separately from the image data in a second database;
    generating a locator on a network configured to identify a storage location of the image data and the information; and
    providing the locator in a message.

17. The memory device of claim 16,
    wherein the image data is representative of a place, object, event, or experience; and wherein the information includes a description of the place, object, event, or experience.

18. The memory device of claim 16, wherein the image data is uploaded from the computing device using a graphical user interface.

19. The memory device of claim 16, wherein the locator comprises a uniform resource locator (URL).

20. The memory device of claim 16, wherein the processing device is configured to perform operations further comprising generating a display of the image data and the information in response to a request that includes at least a portion of the locator.

21. The memory device of claim 16, wherein the processing device is configured to perform operations further comprising forwarding the message to a recipient.

22. The memory device of claim 16, wherein the processing device is configured to perform operations further comprising modifying the image data or the information.

23. The method of claim 1, wherein the first database is distinct from the second database.

\* \* \* \* \*